US012720605B2

(12) United States Patent
Lim et al.

(10) Patent No.: US 12,720,605 B2
(45) Date of Patent: Aug. 25, 2026

(54) USING PHYSICAL RANDOM ACCESS CHANNEL (PRACH) TO IDENTIFY MULTIPLE FEATURES AND COMBINATIONS OF FEATURES

(71) Applicant: Intel Corporation, Santa Clara, CA (US)

(72) Inventors: Seau Sian Lim, Santa Clara, CA (US); Marta Martinez Tarradell, Portland, OR (US); Yi Guo, Shanghai (CN); Sudeep Palat, Gloucestershire (GB); Candy Yiu, Santa Clara, CA (US); Yujian Zhang, Santa Clara, CA (US); Ansab Ali, Beaverton, OR (US); Youn Hyoung Heo, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 18/559,004

(22) PCT Filed: Sep. 16, 2022

(86) PCT No.: PCT/US2022/043831
§ 371 (c)(1),
(2) Date: Nov. 3, 2023

(87) PCT Pub. No.: WO2023/044025
PCT Pub. Date: Mar. 23, 2023

(65) Prior Publication Data

US 2024/0237082 A1 Jul. 11, 2024

Related U.S. Application Data

(60) Provisional application No. 63/246,271, filed on Sep. 20, 2021.

(51) Int. Cl.
*H04W 74/0833* (2024.01)
*H04W 74/00* (2009.01)

(52) U.S. Cl.
CPC ..... *H04W 74/0833* (2013.01); *H04W 74/002* (2013.01)

(58) Field of Classification Search
CPC ............. H04W 74/002; H04W 74/006; H04W 74/0808; H04W 74/0833
See application file for complete search history.

(56) References Cited

U.S. PATENT DOCUMENTS

| | | | |
|---|---|---|---|
| 2020/0305202 | A1 | 9/2020 | Zhang et al. |
| 2021/0112590 | A1 | 4/2021 | Kim et al. |

(Continued)

OTHER PUBLICATIONS

International Patent Office—International Search Report and Written Opinion mailed Jan. 12, 2023, from International Patent Application No. PCT/US2022/043831, 11 pages.

(Continued)

*Primary Examiner* — Kashif Siddiqui
(74) *Attorney, Agent, or Firm* — Schwegman Lundberg & Woessner, P.A.

(57) ABSTRACT

Various embodiments herein are directed to using random access channel (RACH) configuration parameters to identify multiple features and combinations of features. In particular, some embodiments are directed to extensions to RACH configuration information elements (IEs) to identify multiple features and feature combinations.

20 Claims, 11 Drawing Sheets

(56) References Cited

U.S. PATENT DOCUMENTS

| | | | | |
|---|---|---|---|---|
| 2023/0038191 | A1* | 2/2023 | He | H04W 74/006 |
| 2024/0276538 | A1* | 8/2024 | Li | H04W 74/002 |
| 2024/0292467 | A1* | 8/2024 | Futaki | H04W 48/20 |

OTHER PUBLICATIONS

Apple, "Cross-WI RACH Design," 3GPP TSG-RAN WG2 Meeting #115, R2-2107575, Agenda Item: 8.18, Aug. 9-27, 2021, E-meeting, 4 pages.

Huawei, et al., "RACH indication and partitioning," 3GPP TSG RAN WG2 #115-e, R2-2108210, Agenda item: 8.18, Aug. 9-27, 2021, Electronic Meeting, 10 pages.

Qualcomm Incorporated, "Unified approach to RACH partitioning and indication," 3GPP TSG-RAN WG2 Meeting #115-e, R2-2107219, Agenda item: 8.18, Aug. 16-27, 2021, Online, 5 pages.

"European Application Serial No. 22870761.8, Extended European Search Report mailed Jun. 23, 2025", 9 pgs.

"European Application Serial No. 22870761.8, Response filed Jan. 12, 2026 to Extended European Search Report mailed Jun. 23, 2025", 15 pgs.

"International Application Serial No. PCT/US2022/043831, International Preliminary Report on Patentability mailed Apr. 4, 2024", 7 pgs.

Incorporated, Qualcomm, "Unified approach to RACH partitioning and indication", 3GPP Draft; R2-2107219, 3rd Generation Partnership Project (3GPP), [Online]. Retrieved from the Internet: <URL: https://ftp.3gpp.org/tsg_ran/WG2_RL2/TSGR_2115-e/Docs/R2-2107219>, (Aug. 6, 2021), 5 pages.

Vivo, "Discussion on RACH Partitioning in Rel-17", 3GPP Draft; R2-2107058, 3rd Generation Partnership Project (3GPP), Mobile Competence Centre ; 650, Route Des Lucioles ; F-06921 Sophia-Antipolis Cedex, [Online]. Retrieved from the Internet: <URL: https://ftp.3gpp.org/tsg_ran/WG2_RL2/TSGR2_115-e/Docs/R2-2107058>, (Aug. 6, 2021), 9 pages.

* cited by examiner

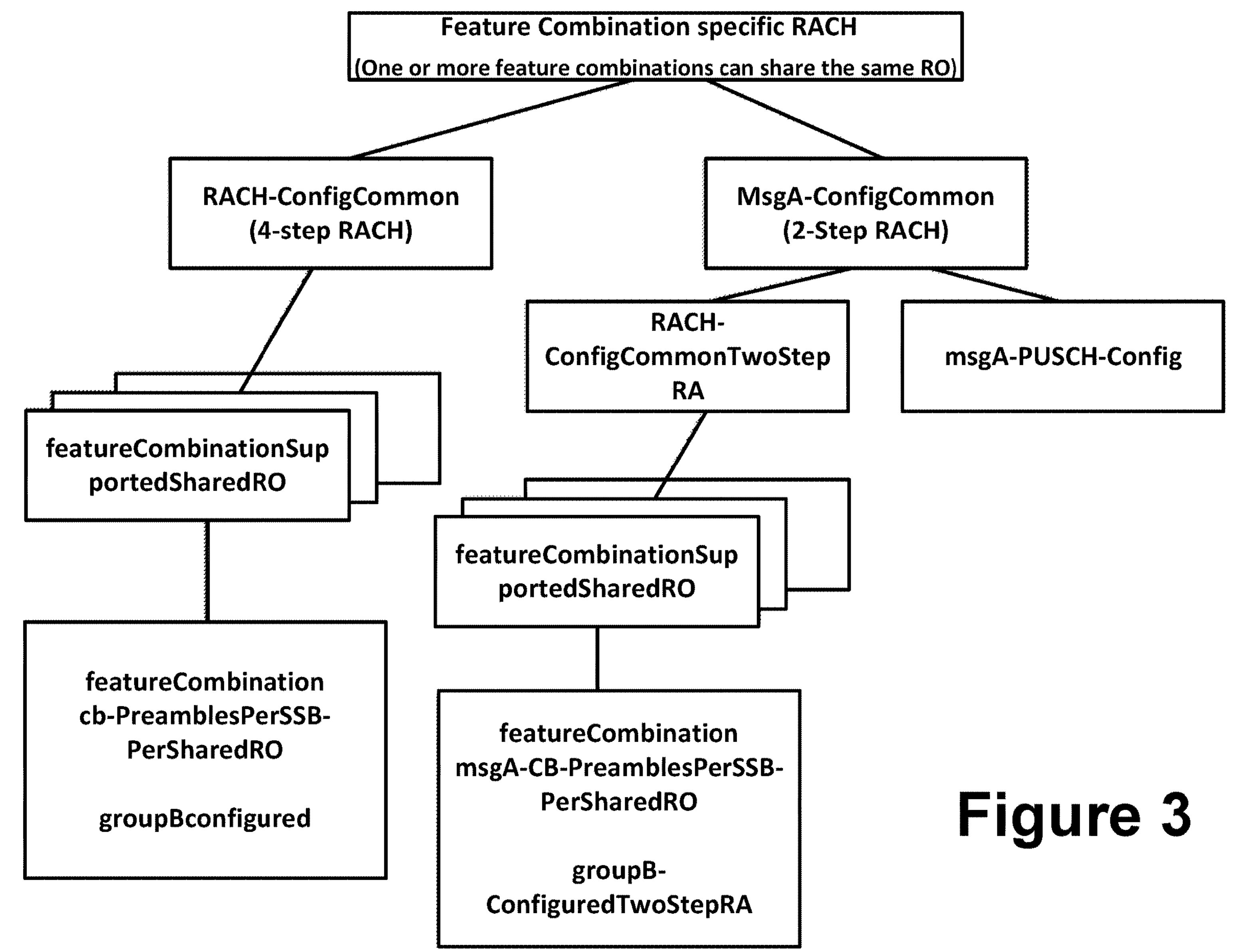
Feature Combination specific RACH
(One or more feature combinations can share the same RO)
RACH-ConfigCommon
(4-step RACH)
MsgA-ConfigCommon
(2-Step RACH)
RACH-ConfigCommonTwoStepRA
msgA-PUSCH-Config
featureCombinationSupportedSharedRO
featureCombinationSupportedSharedRO
featureCombination
cb-PreamblesPerSSB-PerSharedRO
groupBconfigured
featureCombination
msgA-CB-PreamblesPerSSB-PerSharedRO
groupB-ConfiguredTwoStepRA
Figure 3

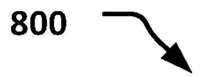

Receiving, by a user equipment (UE) from a next-generation NodeB (gNB), a message containing an information element (IE) that includes random access channel (RACH) configuration information comprising a list of RACH features or feature combinations supported by a network
805

Selecting a set of RACH resources for a RACH procedure based on the RACH configuration information and RACH features or feature combinations supported by the UE
810

Figure 8

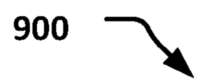

Retrieving, from a memory, random access channel (RACH) configuration information included in an information element (IE) received in a message from an a next-generation NodeB (gNB), the RACH configuration information comprising a list of RACH features or feature combinations supported by a network
905

Selecting a set of RACH resources for a RACH procedure based on the RACH configuration information and RACH features or feature combinations supported by the UE
910

Figure 9

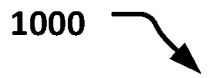

Receiving, from a next-generation NodeB (gNB), a message containing an information element (IE) that includes random access channel (RACH) configuration information comprising a list of RACH features or feature combinations supported by a network
1005

Selecting a set of RACH resources for a RACH procedure based on the RACH configuration information and RACH features or feature combinations supported by the UE, wherein the set of RACH resources is selected based on one or more of: one or more of: a reference signal received power (RSRP) threshold, whether the UE is a reduced capability (RedCap) UE, a slice group determined by an upper layer, applicability of small data transmission (SDT) to the UE, and an availability of RACH resources for a cell
1010

Figure 10

USING PHYSICAL RANDOM ACCESS CHANNEL (PRACH) TO IDENTIFY MULTIPLE FEATURES AND COMBINATIONS OF FEATURES

CROSS REFERENCE TO RELATED APPLICATION

The present application is a national phase entry under 35 U.S.C. § 371 of International Application No. PCT/US2022/043831, filed Sep. 16, 2022, entitled "USING PHYSICAL RANDOM ACCESS CHANNEL (PRACH) TO IDENTIFY MULTIPLE FEATURES AND COMBINATIONS OF FEATURES," which claims priority to U.S. Provisional Patent Application No. 63/246,271, which was filed Sep. 20, 2021, the entire disclosures of which are hereby incorporated by reference.

FIELD

Various embodiments generally may relate to the field of wireless communications. For example, some embodiments may relate to using random access channel (RACH) configuration parameters to identify multiple features and combinations of features. In particular, some embodiments are directed to extensions to RACH configuration information elements (IEs) to identify multiple features and feature combinations.

BACKGROUND

In general, preamble partitioning is applied by a user equipment (UE) to reduce the probability of PRACH collision in 4-step RACH when the time-frequency resources are shared among UEs. With the introduction of 2-step RACH in Rel-16, preamble partitioning is extended to indicate whether the UE is performing 2-step RACH or 4-step RACH in the case of shared RACH occasion (RO), for example where 2-step RACH and 4-step RACH are sharing the same time-frequency resources. Within the 2-step RACH preamble, it can be further partitioned to indicate whether the MsgA PUSCH resources used. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates an example of a diagram depicting an example of a RACH configuration structure for Alternative 1.

FIGS. 8, 9, and 10 illustrate examples of procedures for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1A:
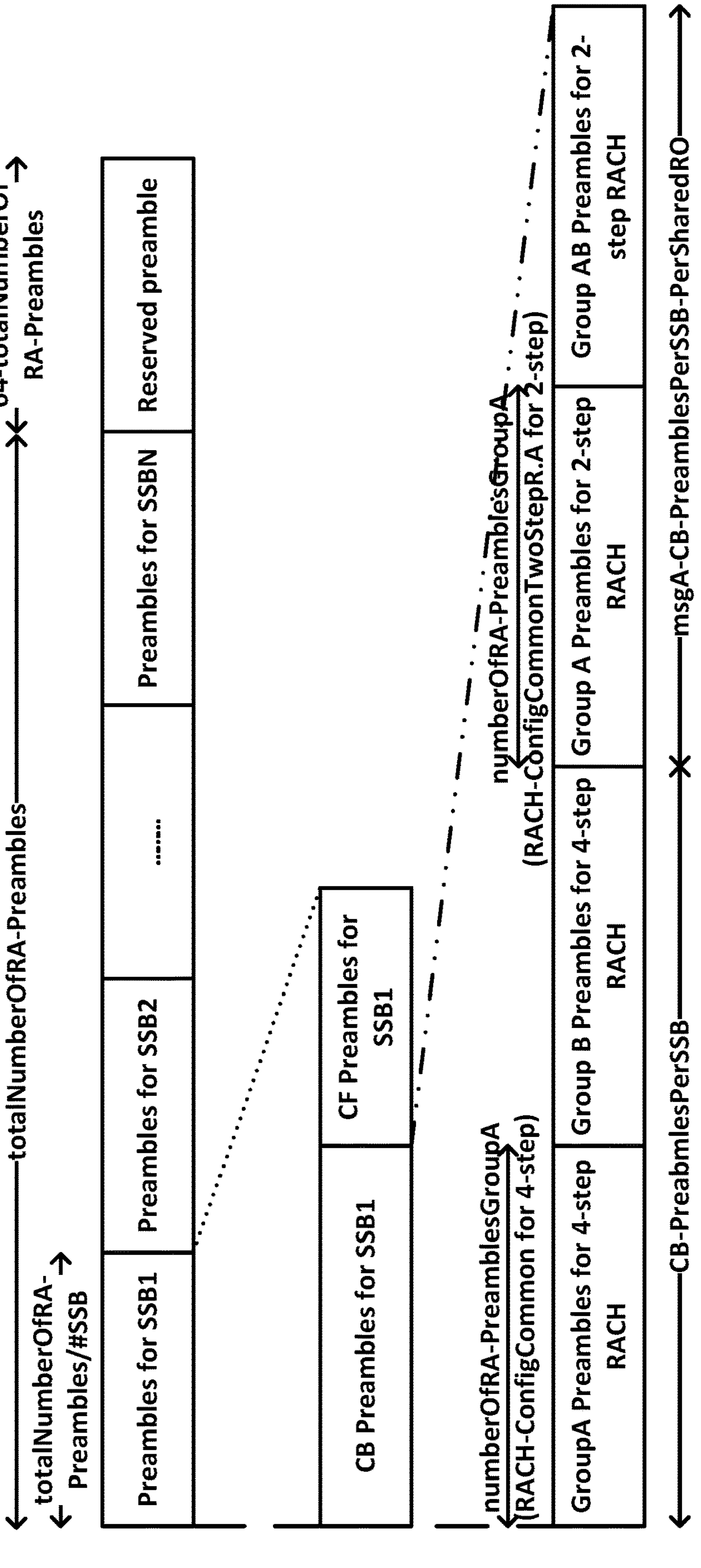
FIG. 1A illustrates an example of preamble partitioning for a shared RO case in accordance with various embodiments.
Figure 1B:
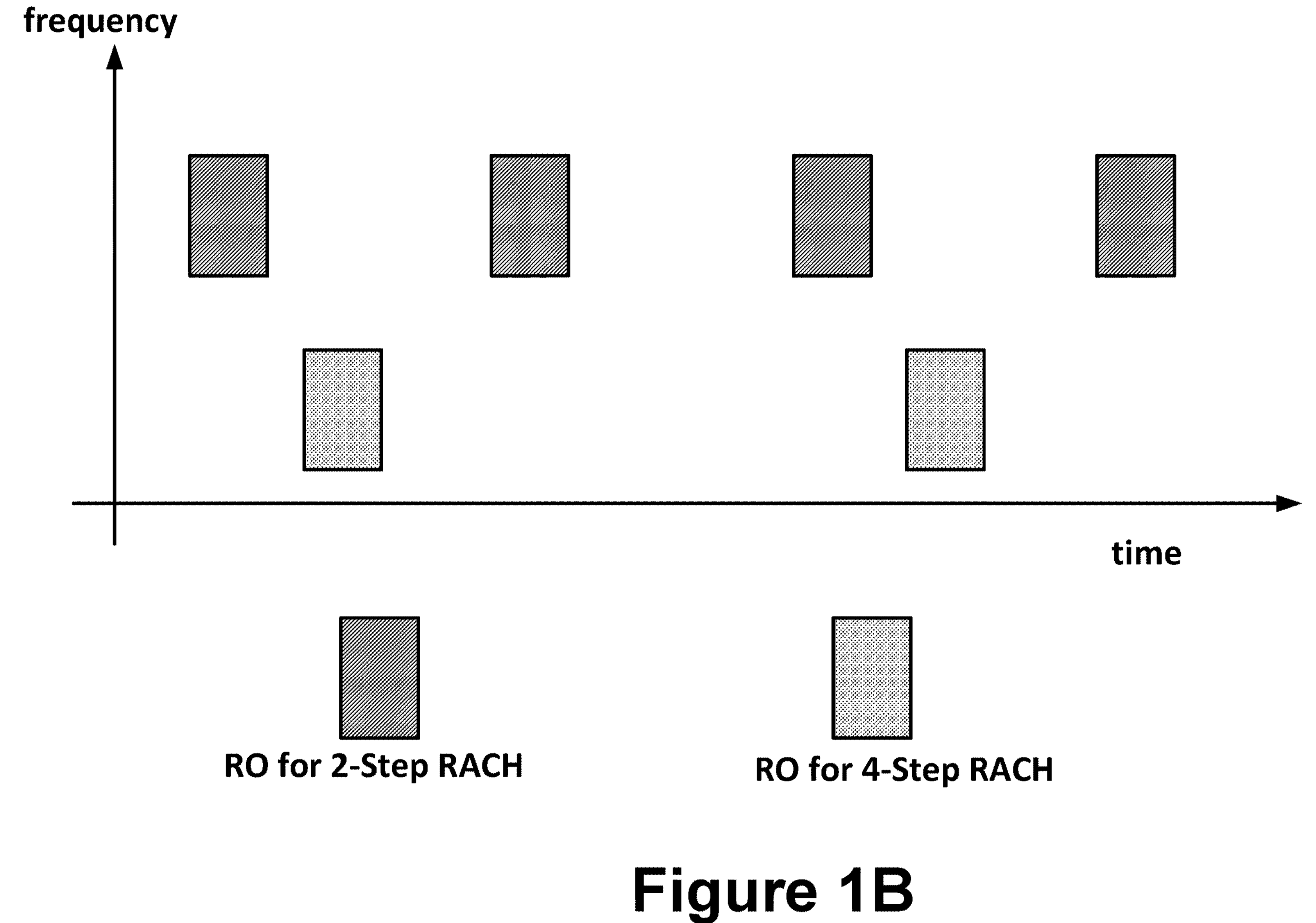
FIG. 1B illustrates an example of separate ROs applied to two-step RACH in accordance with various embodiments.

FIG. 1A illustrates an example of preamble partitioning for a shared RO case in accordance with various embodiments. Other than cases with shared ROs, a separate RO (e.g. different time-frequency ROs configured for 2-step and 4-step RACH) is also applicable to 2-step RACH, as illustrated in FIG. 1B. This disclosure proceeds by describing examples of embodiments addressing at least the following problem statements.

Problem 1: Extend the Existing RACH Configuration to Support Multiple Features Requiring PRACH Partitioning (e.g. Preamble Partitioning and Time and Frequency Partitioning)

In Rel-17, further preamble partitioning is required among different features in the shared RO case and also to enable separate RO among the different features other than just for differentiating between 2-step and 4-step RACH. These require new signaling for supporting multiple PRACH partitioning (preamble and/or time frequency domains) each for a new Rel-17 features or multiple Rel-17 features (when referring to a combination of multiple features or a feature combination).

Problem 2: RACH Resource/Configuration Selection for the Case where Different Feature Combinations are Supported by the Network and UE Another issue is that as a given cell might not support all feature combinations and UE may support and need different feature combination to the cell during the random access (e.g. cell supports PRACH resources/configuration for slicing+Redcap and SDT+RedCap but UE can support/require SDT+Slicing+RedCap). There is a need to define how the UE selects the PRACH resources/configuration corresponding to which feature combinations when required.

Problem 3: Fallback Mechanism (from 2-Step RA to 4-Step RA via Msg1) in the Case PRACH Resource/Configuraton for Different Feature Combinations Exist In Rel-16 with the introduction of 2-step RACH, a fallback mechanism is introduced to allow the UE to reattempt the random access via Msg1 of 4-step RACH after the UE fails to get access via 2-step RACH for certain number of MsgA retransmissions. With cell supporting different PRACH resource/configuration corresponding to different feature combination, there is a need to define how the UE performs the fallback mechanism when PRACH resource/configuration corresponding to different feature combinations exist.

The feature combination possible for PRACH partitioning in Rel-17 are from the combination of the following features:

Small Data TX (SDT)
Slicing
Early indication for Msg3 repetitions (CovEnh)
Early indication for reduced capability UE (RedCap)

However, this can be extended to also include new features introduced for example, in future releases. There are no existing solutions available defined in the specification to support physical random access channel (PRACH) to provide identification of multiple features and potential combinations of them. Embodiments of the present disclosure address these issues as described below:

Solution for Problem 1:

Some embodiments may extend the existing signaling to allow for signaling multiple PRACH configurations/resources (Separate ROs) and multiple feature combinations supported by the cell can share the same PRACH configuration/resource (Shared ROs).

Solution for Problem 2:

During the feature combination selection, the UE may select the PRACH configuration/resources corresponding to:

Option 1: Legacy common PRACH configuration/resources of the BWP if no PRACH configuration/resources are signaled by the network correspond to the feature combination required/supported by the UE.

Option 2: Feature combination based on the maximum number of features matching between the feature combination supported by the cell and the feature combination required and supported by the UE.

Option 3: Feature combination supported by the cell with the highest priority that matches the feature combination required and supported by the UE.

Option 4: Any combination of the above options.

The above options can be set either as a fixed rule in the specification, or configurable by the network.

Solution for Problem 3:

Not all features or combinations of those features can fallback from 2-step RACH to 4-step RACH (e.g. the combination of 2-step RA and CE are excluded, the only features that can fallback is SDT, slicing and RedCap). For those features that can fallback, the followings are some options.

Option 1: Set fix rules for fallback in the specification: Fallback only to the feature combination specific 4-step RACH (if configured); otherwise restart the RACH procedure on common 4-step RACH Option 2: Set fallback feature combination rules (which may also be referred as fallback rules) from 2-step RACH to 4-step RACH when the specific feature or combination of the features is not available in 4-step RACH (but was in 2-step RACH). For example, the UE initiates the 2-step RACH for SDT, Slicing and RedCap. But cell only configure 4-step RACH for SDT+RedCap or slicing+RedCap. Network can indicate whether the UE can fallback to SDT+RedCap or Slicing+RedCap.

Even though for fallback from 4-step RACH to 2-step RACH, this solution can also be applied for fallback from feature combination specific 2-step RACH to another feature combination specific/common 2-step RACH or from feature combination specific 4-step RACH to another feature combination specific/common 4-step RACH or feature combination specific 2-step RACH to another feature combination specific/common 4-step RACH.

Without the above problems solved, it is not possible to support PRACH partitioning for multiple features or feature combination. Aspects of various solutions/options/approaches described herein may be combined, even when not explicitly stated in this disclosure.

Detailed Solution for Problem 1:To Support Separate RO for Different Feature Combination Other than the existing common RACH (for 2-step and/or 4-step RACH), it is possible to have a list of separate PRACH configuration/resources where each entry can be for one or more feature combination. It is also possible that some feature combination specific RACH may only have 4-step RACH (e.g. RACH-ConfigCommon) and not 2-step RACH (e.g. MsgA-ConfigCommon) and vice versa.

Figure 2:
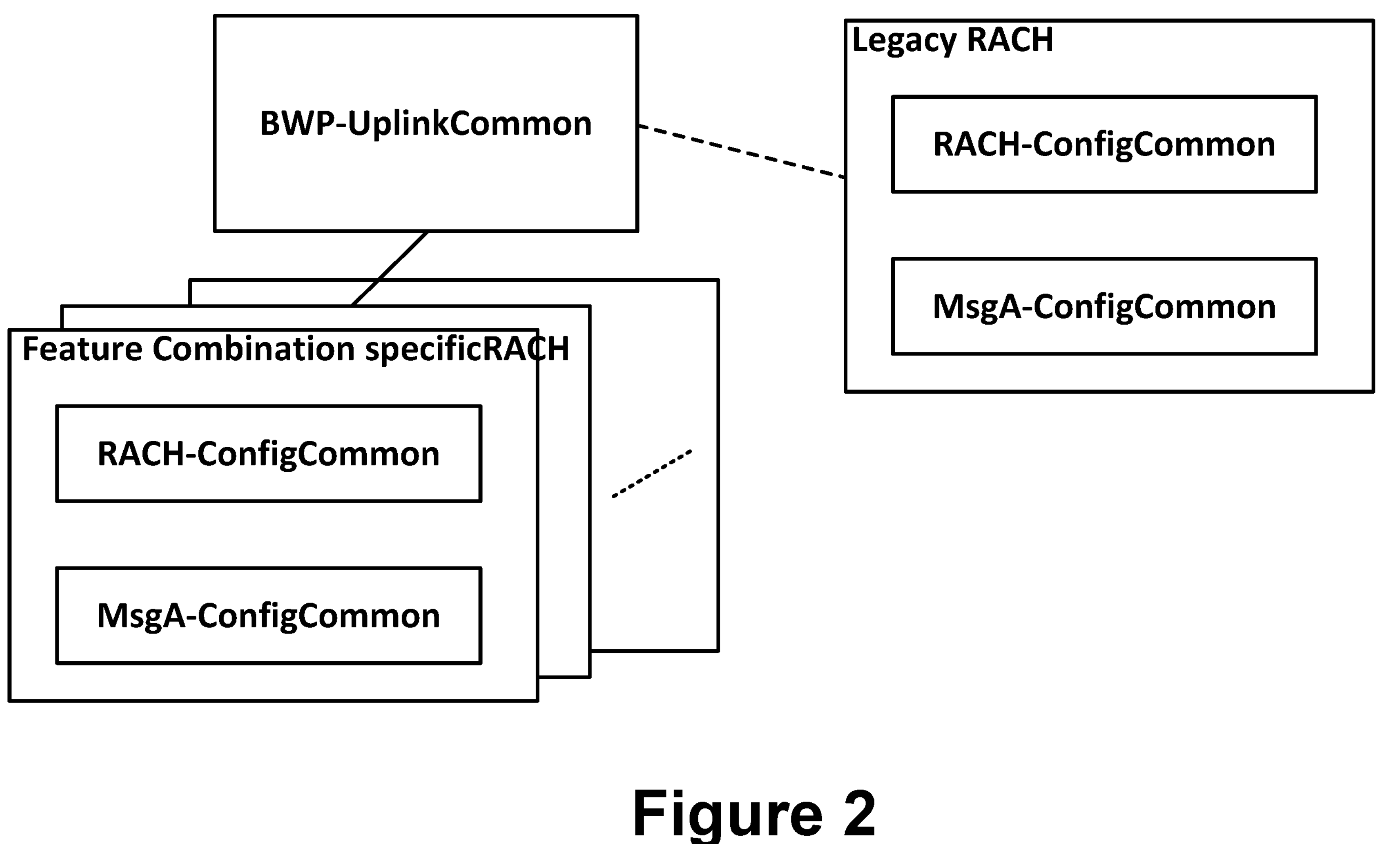
FIG. 2 illustrates an example of a diagram depicting a RACH configuration structure in accordance with various embodiments.

An example of a diagram depicting a RACH configuration structure is shown in FIG. 2, which assumes that the 4-step and/or 2-step RACH configuration/resources are provided together. Alternatives or examples of the ASN. 1 signaling illustration of the above configuration structure for separate RO is shown below:

Alternative 1: Feature Combinations that use the FeatureCombinationRACH-resource is indicated within the resource configuration for 4-step RACH (e.g. RACH-ConfigCommon) or in 2-step RACH (e.g. RACH-ConfigCommonTwoStepRA-r16). The following is an example of ASN signaling for Alternative 1 (this does not preclude embodiments that use other suitable signaling with the same substantive content but with different parameter names):

```
BWP-UplinkCommon ::=           SEQUENCE {
   genericParameters            BWP,
   rach-ConfigCommon            SetupRelease { RACH-ConfigCommon }          OPTIONAL,  --
Need M
   pusch-ConfigCommon           SetupRelease { PUSCH-ConfigCommon }         OPTIONAL,  --
Need M
   pucch-ConfigCommon           SetupRelease { PUCCH-ConfigCommon }
      OPTIONAL,    -- Need M
   ...,
   [[
```

-continued

```
  rach-ConfigCommonIAB-r16       SetupRelease { RACH-ConfigCommon }          OPTIONAL,
-- Need M
  useInterlacePUCCH-PUSCH-r16 ENUMERATED {enabled}                        OPTIONAL,   --
Need R
  msgA-ConfigCommon-r16         SetupRelease { MsgA-ConfigCommon-r16 }        OPTIONAL
-- Cond SpCellOnly2
  ]],
    [[
    -- Providing a pool of separate RO (e.g. using PRACH-COnfigurationIndex)
    featureCombinationRACH-ResourcesList-r17   SEQUENCE
(SIZE(1...maxFeatureCombList) OF FeatureCombinationRACH-Resource-r17
    OPTIONAL    -- Need M
    ]]
}
FeatureCombinationRACH-Resource-r17 ::= SEQUENCE {
  rach-ConfigCommon-r17            SetupRelease { RACH-ConfigCommon }          OPTIONAL,
-- Need M
  msgA-ConfigCommon-r17            SetupRelease { MsgA-ConfigCommon-r16 }        OPTIONAL
-- Need M
    }
MsgA-ConfigCommon-r16 ::=           SEQUENCE {
  rach-ConfigCommonTwoStepRA-r16      RACH-ConfigCommonTwoStepRA-r16,
  msgA-PUSCH-Config-r16              MsgA-PUSCH-Config-r16
OPTIONAL --Cond InitialBWPConfig
}
```

Even though ASN.1 is reusing the Rel-15 RACH-ConfigCommon for 4-step RACH and Rel-16 MsgA-ConfigCommon-r16 for 2-step RACH, it is also possible to use a new IE for either of them (e.g. RACH-ConfigCommon-r17 for 4-step RACH and MsgA-ConfigCommon-r17 for 2-step RACH). This may be desirable if there are sufficient differences in the contents of the RACH configuration for Rel-17 (in comparison to current one). This also applies to other alternatives explained in this disclosure.

In the above alternative, it is assumed that all feature combinations which are not enabled in any feature combination specific PRACH configuration/resources or in common PRACH configuration/resources (as shared RO) are by default using the common PRACH configuration/resources as per legacy RO. It is also possible to explicitly include whether a feature combination is part of the common PRACH configuration/resources as per legacy RO. This also applies to other alternatives explained in this disclosure.

Alternative 2: Feature Combinations that use the FeatureCombinationRACH-resource is indicated explicitly in the FeatureCombinationRACH-resource

```
BWP-UplinkCommon ::=                 SEQUENCE {
  genericParameters                  BWP,
  rach-ConfigCommon                  SetupRelease { RACH-ConfigCommon }        OPTIONAL,   --
Need M
  pusch-ConfigCommon                 SetupRelease { PUSCH-ConfigCommon }       OPTIONAL,   --
Need M
  pucch-ConfigCommon                 SetupRelease { PUCCH-ConfigCommon }
    OPTIONAL,   -- Need M
  ...,
  [[
  rach-ConfigCommonIAB-r16           SetupRelease { RACH-ConfigCommon }         OPTIONAL,
-- Need M
  useInterlacePUCCH-PUSCH-r16 ENUMERATED {enabled}                             OPTIONAL,   --
Need R
  msgA-ConfigCommon-r16              SetupRelease { MsgA-ConfigCommon-r16 }      OPTIONAL
-- Cond SpCellOnly2
  ]],
    [[
    -- Providing a pool of separate RO (e.g. using PRACH-COnfigurationIndex)
    featureCombinationRACH-ResourcesList-r17   SEQUENCE
(SIZE(1...maxFeatureCombList) OF FeatureCombinationRACH-Resource-r17
    OPTIONAL    -- Need M
    ]]
}
FeatureCombinationRACH-Resource-r17 ::= SEQUENCE {
  featureCombinationList-r17              SEQUENCE (SIZE{1..maxFeatureCombList}) OF
    {
      redCap-r17                    ENUMERATED{true} OPTIONAL,
      sdt-r17                     ENUMERATED{true} OPTIONAL,
      slicing-r17                   ENUMERATED{true} OPTIONAL,
      covEnh-r17                      ENUMERATED{true} OPTIONAL
    },
```

-continued

```
  rach-ConfigCommon-r17              SetupRelease { RACH-ConfigCommon }        OPTIONAL,
-- Need M
  msgA-ConfigCommon-r17              SetupRelease { MsgA-ConfigCommon-r16 }    OPTIONAL
-- Need M
     }
```

Alternative 3: Using an indexing approach to link the feature combination to its corresponding PRACH configuration.

```
BWP-UplinkCommon ::=                 SEQUENCE {
  genericParameters                  BWP,
  rach-ConfigCommon                  SetupRelease { RACH-ConfigCommon }        OPTIONAL,   --
Need M
  pusch-ConfigCommon                 SetupRelease { PUSCH-ConfigCommon }       OPTIONAL,   --
Need M
  pucch-ConfigCommon                 SetupRelease { PUCCH-ConfigCommon }
     OPTIONAL,   -- Need M
  ...,
  [[
  rach-ConfigCommonIAB-r16           SetupRelease { RACH-ConfigCommon }        OPTIONAL,
-- Need M
  useInterlacePUCCH-PUSCH-r16 ENUMERATED {enabled}                             OPTIONAL,   --
Need R
  msgA-ConfigCommon-r16              SetupRelease { MsgA-ConfigCommon-r16 }    OPTIONAL
-- Cond SpCellOnly2
  ]],
     [[
     -- Providing a pool of separate RO (e.g. using PRACH-COnfigurationIndex)
     featureCombinationRACH-ResourcesList-r17   SEQUENCE
(SIZE(2...maxFeatureCombList) OF FeatureCombinationRACH-Resource-r17
     OPTIONAL,   -- Need M
     featureCombinationSupportList-r17SEQUENCE (SIZE(1...maxFeatureCombList) OF
FeatureCombinationSupport-r17              OPTIONAL,   -- Need M
     ]]
}
FeatureCombinationSupport-r17 ::= SEQUENCE {
     featureCombination-r17          SEQUENCE {
       redCap-r17                    ENUMERATED{true} OPTIONAL,
       sdt-r17                       ENUMERATED{true} OPTIONAL,
       slicing-r17                   ENUMERATED{true} OPTIONAL,
       covEnh-r17                    ENUMERATED{true} OPTIONAL
     },
     -- Index of 1 reference the Common RACH configuration (e.g. the legacy Common RACH).
     -- Alternativelly, absence of RACH-Resource-r17 may mean the usage of common RACH
config.
     RACH-Resource-r17               INTEGER(1..maxFeatureCombList)            OPTIONAL, Need M
}
FeatureCombinationRACH-Resource-r17 ::= SEQUENCE {
  rach-ConfigCommon-r17              SetupRelease { RACH-ConfigCommon }        OPTIONAL,
-- Need M
  msgA-ConfigCommon-r17              SetupRelease { MsgA-ConfigCommon-r16 }    OPTIONAL
-- Need M
     }
```

Another version of this alternative is to allow 4-step RACH resource and 2-step RACH resource to be separated as follows:

```
BWP-UplinkCommon ::=                 SEQUENCE {
  genericParameters                  BWP,
  rach-ConfigCommon                  SetupRelease { RACH-ConfigCommon }        OPTIONAL,   --
Need M
  pusch-ConfigCommon                 SetupRelease { PUSCH-ConfigCommon }       OPTIONAL,   --
Need M
  pucch-ConfigCommon                 SetupRelease { PUCCH-ConfigCommon }
     OPTIONAL,   -- Need M
  ...,
  [[
  rach-ConfigCommonIAB-r16           SetupRelease { RACH-ConfigCommon }        OPTIONAL,
-- Need M
  useInterlacePUCCH-PUSCH-r16 ENUMERATED {enabled}                             OPTIONAL,   --
```

-continued

```
Need R
  msgA-ConfigCommon-r16                 SetupRelease { MsgA-ConfigCommon-r16 }       OPTIONAL
-- Cond SpCellOnly2
  ]],
    [[
    -- Providing a pool of separate RO (e.g. using PRACH-COnfigurationIndex)
    featureCombinationTwoStepRACH-ResourcesList-r17 SEQUENCE
(SIZE(2...maxFeatureCombList) OF FeatureCombinationTwoStepRACH-Resource-r17
    OPTIONAL,   -- Need M
    featureCombinationFourStepRACH-ResourcesList-r17 SEQUENCE
(SIZE(2...maxFeatureCombList) OF FeatureCombinationFourStepRACH-Resource-r17
    OPTIONAL,   -- Need M
    featureCombinationSupportList-r17SEQUENCE (SIZE(1...maxFeatureCombList) OF
FeatureCombinationSupport-r17                  OPTIONAL,   -- Need M
    ]]
}
FeatureCombinationSupport-r17 ::= SEQUENCE {
    featureCombination-r17                SEQUENCE {
      redCap-r17                        ENUMERATED{true} OPTIONAL,
      sdt-r17                           ENUMERATED{true} OPTIONAL,
      slicing-r17                       ENUMERATED{true} OPTIONAL,
      covEnh-r17                          ENUMERATED{true} OPTIONAL
    },
    -- Index of 1 reference the Common RACH configuration (e.g. the legacy Common 2-step
RACH)
    twoStepRACH-Resource-r17              INTEGER(1..maxFeatureCombList)            OPTIONAL,
Need M
    -- Index of 1 reference the Common RACH configuration (e.g. the legacy Common 4-step
RACH)
    fourStepRACH-Resource-r17             INTEGER(1..maxFeatureCombList)            OPTIONAL,
Need M
}
FeatureCombinationFourStepRACH-Resource-r17 ::= SEQUENCE {
  rach-ConfigCommon-r17                   SetupRelease { RACH-ConfigCommon }        OPTIONAL   -
- Need M
}
FeatureCombinationTwoStepRACH-Resource-r17 ::= SEQUENCE {
  msgA-ConfigCommon-r17                   SetupRelease { MsgA-ConfigCommon-r16 }     OPTIONAL
-- Need M
    }
```

To support shared RO among the feature combinations (and in order to indicate the feature combination supported in the shared RO), for each of the feature combination specific RACH configuration entry in the feature combination specific RACH list, the network can configure feature combination specific 4-step RACH resource and/or feature combination specific 2-step RACH resource. An example of a diagram depicting an example of a RACH configuration structure is shown in FIG. 3 for Alternative 1. ASN.1 illustration for 4-step RACH and for 2-step RACH are shown below:

4-Step RACH (RACH-ConfigCommon)

```
-- ASN1START
-- TAG-RACH-CONFIGCOMMON-START
RACH-ConfigCommon ::=                       SEQUENCE {
  rach-ConfigGeneric                        RACH-ConfigGeneric,
  totalNumberOfRA-Preambles                   INTEGER (1..63)
OPTIONAL,   -- Need S
  ssb-perRACH-OccasionAndCB-PreamblesPerSSB   CHOICE {
    oneEighth                               ENUMERATED
{n4,n8,n12,n16,n20,n24,n28,n32,n36,n40,n44,n48,n52,n56,n60,n64},
    oneFourth                               ENUMERATED
{n4,n8,n12,n16,n20,n24,n28,n32,n36,n40,n44,n48,n52,n56,n60,n64},
    oneHalf                                 ENUMERATED
{n4,n8,n12,n16,n20;n24,n28,n32,n36,n40,n44,n48,n52,n56,n60,n64},
    one                                     ENUMERATED
{n4,n8,n12,n16,n20,n24,n28,n32,n36,n40,n44,n48,n52,n56,n60,n64},
    two                                     ENUMERATED {n4,n8,n12,n16,n20,n24,n28,n32},
    four                                    INTEGER (1..16),
    eight                                   INTEGER (1..8),
    sixteen                                 INTEGER (1..4)
  }                                                                   OPTIONAL,   -- Need M
  groupBconfigured                          SEQUENCE {
    ra-Msg3SizeGroupA                         ENUMERATED {b56, b144, b208, b256, b282, b480,
b640,
                                            b800, b1000, b72, spare6, spare5,spare4, spare3, spare2,
spare1},
```

-continued

4-Step RACH (RACH-ConfigCommon)

```
      messagePowerOffsetGroupB                    ENUMERATED { minusinfinity, dB0, dB5, dB8,
dB10, dB12, dB15, dB18},
      numberOfRA-PreamblesGroupA                  INTEGER (1..64)
   }                                                              OPTIONAL,   -- Need R
   ra-ContentionResolutionTimer                ENUMERATED { sf8, sf16, sf24, sf32, sf40, sf48,
sf56, sf64},
   rsrp-ThresholdSSB                        RSRP-Range              OPTIONAL,
-- Need R
   rsrp-ThresholdSSB-SUL                      RSRP-Range
OPTIONAL,   -- Cond SUL
   prach-RootSequenceIndex                    CHOICE {
      l839                                 INTEGER (0..837),
      l139                                 INTEGER (0..137)
   },
   msg1-SubcarrierSpacing                      SubcarrierSpacing
OPTIONAL,   -- Cond L139
   restrictedSetConfig                       ENUMERATED {unrestrictedSet, restrictedSetTypeA,
restrictedSetTypeB},
   msg3-transformPrecoder                      ENUMERATED {enabled}
OPTIONAL,   -- Need R
   ...,
   [[
   ra-PrioritizationForAccessIdentity-r16 SEQUENCE {
      ra-Prioritization-r16                    RA-Prioritization,
      ra-PrioritizationForAI-r16                 BIT STRING (SIZE (2))
   }                                                              OPTIONAL,   -- Cond
InitialBWP-Only
   prach-RootSequenceIndex-r16                  CHOICE {
      l571                                 INTEGER (0..569),
      l1151                                INTEGER (0..1149)
   }   OPTIONAL   -- Need R
   ]],
     [[
     -- List of featureCombination shared the RO for 4-step RACH
     -- If included in RACH configuration for legacy and 2-step RACH is configured as well as
shared
     -- RO, preamble partitioning is done after the legacy 2-step RACH
     featureCombinationSupportedSharedRO-List   SEQUENCE
(SIZE(1...maxfeatureCombList) OF FeatureCombinationSupportedSharedRO OPTIONAL   --
Need M
     ]]
}
FeatureCombinationSupportedSharedRO ::= SEQUENCE {
   featureCombination-r17                      SEQUENCE {
         redCap-r17                        ENUMERATED{true} OPTIONAL,
         sdt-r17                         ENUMERATED{true} OPTIONAL,
         slicing-r17                       ENUMERATED{true} OPTIONAL,
         covEnh-r17                          ENUMERATED{true} OPTIONAL
         spare1                              ENUMERATED{true} OPTIONAL,
         spare2                              ENUMERATED{true} OPTIONAL,
         spare3                              ENUMERATED{true} OPTIONAL
     },
     cb-PreamblesPerSSB-PerSharedRO-r16 INTEGER (1..60)        OPTIONAL,      -- Need
M
   groupBconfigured                          SEQUENCE {
      ra-Msg3SizeGroupA                          ENUMERATED {b56, b144, b208, b256, b282, b480,
b640,
                                         b800, b1000, b72, spare6, spare5,spare4, spare3, spare2,
spare1},
      messagePowerOffsetGroupB                    ENUMERATED { minusinfinity, dB0, dB5, dB8,
dB10, dB12, dB15, dB18},
      numberOfRA-PreamblesGroupA                  INTEGER (1..64)
}     OPTIONAL,                           -- Need M
...
}
-- TAG-RACH-CONFIGCOMMON-STOP
-- ASN1STOP
```

2-Step RACH (RACH-ConfigCommonTwoStepRA)

```
-- ASN1START
-- TAG-RACH-CONFIGCOMMONTWOSTEPRA-START
RACH-ConfigCommonTwoStepRA-r16 ::=                          SEQUENCE {
   rach-ConfigGenericTwoStepRA-r16                          RACH-ConfigGenericTwoStepRA-r16,
```

-continued

2-Step RACH (RACH-ConfigCommonTwoStepRA)

```
  msgA-TotalNumberOfRA-Preambles-r16                        INTEGER (1..63)
OPTIONAL, -- Need S
  msgA-SSB-PerRACH-OccasionAndCB-PreamblesPerSSB-r16   CHOICE {
    oneEighth                                   ENUMERATED
{n4,n8,n12,n16,n20,n24,n28,n32,n36,n40,n44,n48,n52,n56,n60,n64},
    oneFourth                                   ENUMERATED
{n4,n8,n12,n16,n20,n24,n28,n32,n36,n40,n44,n48,n52,n56,n60,n64},
    oneHalf                                     ENUMERATED
{n4,n8,n12,n16,n20,n24,n28,n32,n36,n40,n44,n48,n52,n56,n60,n64},
    one                                         ENUMERATED
{n4,n8,n12,n16,n20,n24,n28,n32,n36,n40,n44,n48,n52,n56,n60,n64},
    two                                         ENUMERATED {n4,n8,n12,n16,n20,n24,n28,n32},
    four                                        INTEGER (1..16),
    eight                                       INTEGER (1..8),
    sixteen                                     INTEGER (1..4)
  }                                                              OPTIONAL, -- Cond
2StepOnly
  msgA-CB-PreamblesPerSSB-PerSharedRO-r16                   INTEGER (1..60)
OPTIONAL, -- Cond SharedRO
  msgA-SSB-SharedRO-MaskIndex-r16                           INTEGER (1..15)
OPTIONAL, -- Need S
  groupB-ConfiguredTwoStepRA-r16                            GroupB-ConfiguredTwoStepRA-r16
OPTIONAL, -- Need S
  msgA-PRACH-RootSequenceIndex-r16                          CHOICE {
    l839                                        INTEGER (0..837),
    l139                                        INTEGER (0..137),
    l571                                        INTEGER (0..569),
    l1151                                       INTEGER (0..1149)
  }                                                              OPTIONAL, -- Cond
2StepOnly
  msgA-TransMax-r16                             ENUMERATED {n1, n2, n4, n6, n8, n10, n20,
n50, n100, n200}   OPTIONAL, -- Need R
  msgA-RSRP-Threshold-r16                       RSRP-Range
OPTIONAL, -- Cond 2Step4Step
  msgA-RSRP-ThresholdSSB-r16                    RSRP-Range
OPTIONAL, -- Need R
  msgA-SubcarrierSpacing-r16                    SubcarrierSpacing
OPTIONAL, -- Cond 2StepOnlyL139
  msgA-RestrictedSetConfig-r16                  ENUMERATED {unrestrictedSet,
restrictedSetTypeA,
                                                restrictedSetTypeB}         OPTIONAL,
-- Cond 2StepOnly
  ra-PrioritizationForAccessIdentityTwoStep-r16             SEQUENCE {
    ra-Prioritization-r16                       RA-Prioritization,
    ra-PrioritizationForAI-r16                  BIT STRING (SIZE (2))
  }                                                              OPTIONAL, -- Cond
InitialBWP-Only
  ra-ContentionResolutionTimer-r16              ENUMERATED {sf8, sf16, sf24, sf32, sf40,
sf48, sf56, sf64}   OPTIONAL, -- Cond 2StepOnly
  ...,
   [[
   -- List of featureCombination shared the RO for 2-step RACH
   -- This corresponds to the list of the 4-step RACH if RO is shared
   msgA-FeatureCombinationSupportedSharedRO-List-r17   SEQUENCE
(SIZE(1...maxFeatureCombList) OF MsgA-FeatureCombinationSupportedSharedRO-r17
      OPTIONAL,                                 -- Need M
   ]]
}
GroupB-ConfiguredTwoStepRA-r16 ::=                          SEQUENCE {
  ra-MsgA-SizeGroupA                            ENUMERATED {b56, b144, b208, b256, b282,
b480, b640, b800,
                                                b1000, b72, spare6, spare5, spare4, spare3, spare2,
spare1},
  messagePowerOffsetGroupB                      ENUMERATED {minusinfinity, dB0, dB5,
dB8, dB10, dB12, dB15, dB18},
  numberOfRA-PreamblesGroupA                    INTEGER (1..64)
}
MsgA-FeatureCombinationSupportedSharedRO ::= SEQUENCE {
  featureCombination-r17                        SEQUENCE {
      redCap-r17                                ENUMERATED{true} OPTIONAL,
      sdt-r17                                   ENUMERATED{true} OPTIONAL,
      slicing-r17                               ENUMERATED{true} OPTIONAL,
      covEnh-r17                                ENUMERATED{true} OPTIONAL
      spare1                                    ENUMERATED{true} OPTIONAL,
      spare2                                    ENUMERATED{true} OPTIONAL,
      spare3                                    ENUMERATED{true} OPTIONAL
   },
```

-continued

| 2-Step RACH (RACH-ConfigCommonTwoStepRA) |
| --- |
| MsgA-CB-PreamblesPerSSB-PerSharedRO-r17 INTEGER (1..60) OPTIONAL, -- Need M<br>groupB-ConfiguredTwoStepRA-r17 GroupB-ConfiguredTwoStepRA-r16 OPTIONAL, -- Need M<br>....<br>}<br>-- TAG-RACH-CONFIGCOMMONTWOSTEPRA-STOP<br>-- ASN1STOP |

For Alternative 2, the only difference is that the feature combination is not in the RACH-ConfigCommon for the 4-step RACH and RACH-ConfigCommonTwoStepRA for the 2-step is Alternative 1. RACH as it in However, each of the entry in featureCombinationSupportedSharedRO-List (in RACH-ConfigCommon for 4-step RACH) and msgA-FeatureCombinationSupportedSharedRO-List-r17 (in RACH-ConfigCommonTwoStepRA) corresponds one-to-one to the featureCombinationListIndication-r17 in the associated FeatureCombinationRACH-Resource-r17. This is likewise for Alternative 3.

Detailed Solution for Problem 2:

The feature combination specific PRACH configuration/resources selection is performed between UL carrier selection (to select between SUL and NUL) and RA Type selection (selection between 2-step RA and 4-step RA).

Step 1 Determine the Feature Combination Possible by a UE

Whether a UE can select a particular PRACH configuration/resources corresponding to a feature combination also depends on whether the UE satisfies the criteria set out by the feature. Examples of such criteria is as follow:

- For CovEnh, it depends on a RSRP threshold configured by network. If measured RSRP is below the threshold, UE can request to perform Msg3 repetition
- For Slicing, it depends on whether upper layer indicates the slice group ID to the access stratum
- For RedCap, it depends on whether the UE is a RedCap type UE.
- For SDT, it also depends on whether the network has configured the UE to perform SDT over RACH and whether UE meets the required requirements to initiate RA-SDT (e.g. detecting traffic only for radio bearers configured for SDT, meeting the RSRP threshold specific to SDT or meeting the data volume threshold specific to SDT).

If a feature combination meets the above criteria of the feature supported by the UE, it means the feature combination is possible by the UE. If no RSRP threshold is configured for CovEnh feature, then CovEnh feature is not possible in the feature combination for the UE.

Step 2 Determine the PRACH Configuration/Resources Corresponding to a Feature Combination Supported by a Cell is Valid for the UE However, a cell may not signal the PRACH configuration/resources corresponding to the feature combination possible by the UE (as in Step 1). Hence the UE needs to select the PRACH configuration/resources that are most appropriate.

Based on the feature combination specific PRACH configuration/resources configured by the cell and the feature combination possible by the UE, the UE decides on whether a PRACH configuration/resources corresponding feature combination is valid (e.g. the PRACH configuration/resources corresponding to a feature combination completely meet the need of the UE or partially meet the need of the UE). For example, for completely meet the need of the UE, the feature combination corresponding to a PRACH configuration/resources signalled by the network matches the feature combination possible by the UE. However, a cell may only support a subset of the feature combination possible by the UE. In this case, PRACH configuration/resources corresponding to the feature combination signalled by the cell partially meet the need of the UE. So a PRACH configuration/resources corresponding to a feature combination is valid to a UE if the feature combination:

a. Matches completely the feature combination possible by the UE
b. Matches a subset of the feature combination possible by the UE Step 3: PRACH Configuration/Resources Selection The UE may select the PRACH configuration/resources corresponding to:

Option 0: Any feature combination that is valid to a UE (e.g. leave it to UE implementation)

Option 1: Legacy common PRACH configuration/resources configured in the BWP if no PRACH configuration/resources signalled by the network correspond to the feature combination possible/supported by the UE In this option, if none of the feature combinations supported by the network matches the feature combination supported/possible by the UE (e.g. Option (a) in Step 1 is not met), the legacy common PRACH configuration/resources configured in the BWP is selected by the UE.

Option 2: Feature combination based on the maximum number of features matching between the feature combination supported by the cell and the feature combination possible by the UE.

Instead of using the legacy common PRACH configuration/resources whenever the feature combination possible by the UE is not supported, this option allows the UE to select the PRACH configuration/resources corresponding to the feature combination which is a subset that meet most of the features in the feature combination possible by the UE (e.g. either a. or the largest intersection of b. in Step 2).

If multiple feature combinations meet the condition, additional rules may be required or defined. An example of a possible scenario above is explained is the following:

- Network provides config. for (1) "feature_A & feature_B & feature_C", (2) "feature_A & feature_B & feature_D" and (3) "feature_C & feature_D"
- UE only supports "feature_A & feature_B"
- Therefore, UE could choose between the configuration (1) and (2) depending on the rules defined as previously explained.

The additional rules may be (a) decision is left up to UE, (b) UE chooses based on specified rules or priorities, (c) UE chooses the first feature combination that meets the condition following the order of the list of feature combination provided by the network (for this case (c) other element may be chose instead e.g. the last one), (d) based on indication provided by the network (e.g. priority of the feature combination, or priority of the specific feature within a given feature combination as explained in next option (3)).

Option 3: Feature combination supported by the cell with the highest priority that are valid as in Step 2.

In this option, a priority is provided by the network for each PRACH configuration/resources corresponding to feature combination supported by the cell. The UE will select the PRACH configuration/resources corresponding to the feature combination that are valid as identified in Step 2 with the highest priority. If there are still more than one PRACH configuration/resources with equal priority, it can be left to UE implementation which PRACH configuration/resources corresponding to a feature combination that are valid should be selected.

Alternatively, network can provide priority for each of the feature. The UE will select the PRACH configuration/resources corresponding to the feature combination that are valid as identified in Step 2 which has the highest aggregated priority. For example, there are 2 feature combinations {Slicing+RedCap} and {Slicing+SDT}. If slicing has priority 1, RedCap has priority 2 and SDT has priority 3, the UE will select {Slicing+SDT} as it provides an aggregated priority of 4 while {Slicing+RedCap} provides an aggregated priority of 3. Alternatively, other rules may be followed as explained above in relation to having multiple feature combinations that meet a given condition.

An example of how this option 3 with priority per feature may work is the following:

- Cell supports PRACH configuration/resources corresponding to feature combination CovEnh+Slicing and CovEnh+RedCap. Priority is specified or configured for each feature. CovEnh has priority 4, Slicing has priority 1 and RedCap has priority 3.
- The priority for PRACH configuration/resources corresponding to feature combination CovEnh+Slicing=5 while to feature combination CovEnh+RedCap=7.
- If the feature combination possible by UE is CovEnh+Slicing+RedCap, the UE selects the PRACH configuration/resource corresponding to feature combination CovEnh+RedCap.

Alternatively, the UE will select the PRACH configuration/resource corresponding to the feature combination containing the feature with the highest priority. If there are more than 1 PRACH configuration/resources corresponding to the feature combination containing the feature with the highest priority, the UE will select the PRACH configuration/resource corresponding to the feature combination containing the feature with the next highest priority and so on.

Option 4: Combinations of the above options or part of the options.

Unlike Option 1, the UE will select the legacy common PRACH configuration/resources configured in the BWP if the cell does not support feature combination specific RACH (e.g. legacy cell) or does not provide any feature combination that are valid to the UE (as in Step 2).

On the other hand, if there are PRACH configuration/resources with feature combinations that are valid as in Step 2, the UE will select the PRACH configuration/resources that corresponds to the feature combination based on the maximum number of features matching between the feature combination supported by the cell and the feature combination possible by the UE (as in Option 2). If there are multiple feature combinations that are still valid after applying Option 2, the UE can apply Option 3 to select the PRACH configuration/resources corresponding to the feature combination with the highest priority.

Summary of the Options:

| Options | Key points |
|---|---|
| 0 | It is up to the UE to choose among the PRACH configuration/resources corresponding to feature combinations that are valid to the UE including the legacy common configuration for 4-step RACH and/or 2-step RACH. |
| 1 | If there is a PRACH configuration/resources corresponding to the feature combination that are possible by the UE, the UE will select that, Otherwise, the UE will select the legacy common configuration for 4-step RACH and/or 2-step RACH. |
| 2 | The UE will select the PRACH configuration/resources corresponding to the feature combination that matches most of the features in the feature combination that is possible by the UE. Otherwise, the UE will select the legacy common configuration for 4-step RACH and/or 2-step RACH. |
| 3 | The UE will select the PRACH configuration/resources corresponding to the feature combination that are valid to the UE and if there are more than 1 valid will select one with the highest priority. |
| 4 | This is a mix of Options 1 to 3.<br>If no PRACH configuration/resources corresponding to feature combinations that are valid with the UE, the UE will select the legacy common configuration for 4-step RACH and/or 2-step RACH.<br>Else if there is a PRACH configuration/resources corresponding to the feature combination that are possible by the UE, the UE will select that,<br>Otherwise, if there are one or more PRACH configuration/resources corresponding to the feature combination that are valid, UE selects the PRACH configuration/resources corresponding to the feature combination that has the highest priority assigned. |

Figure 4:
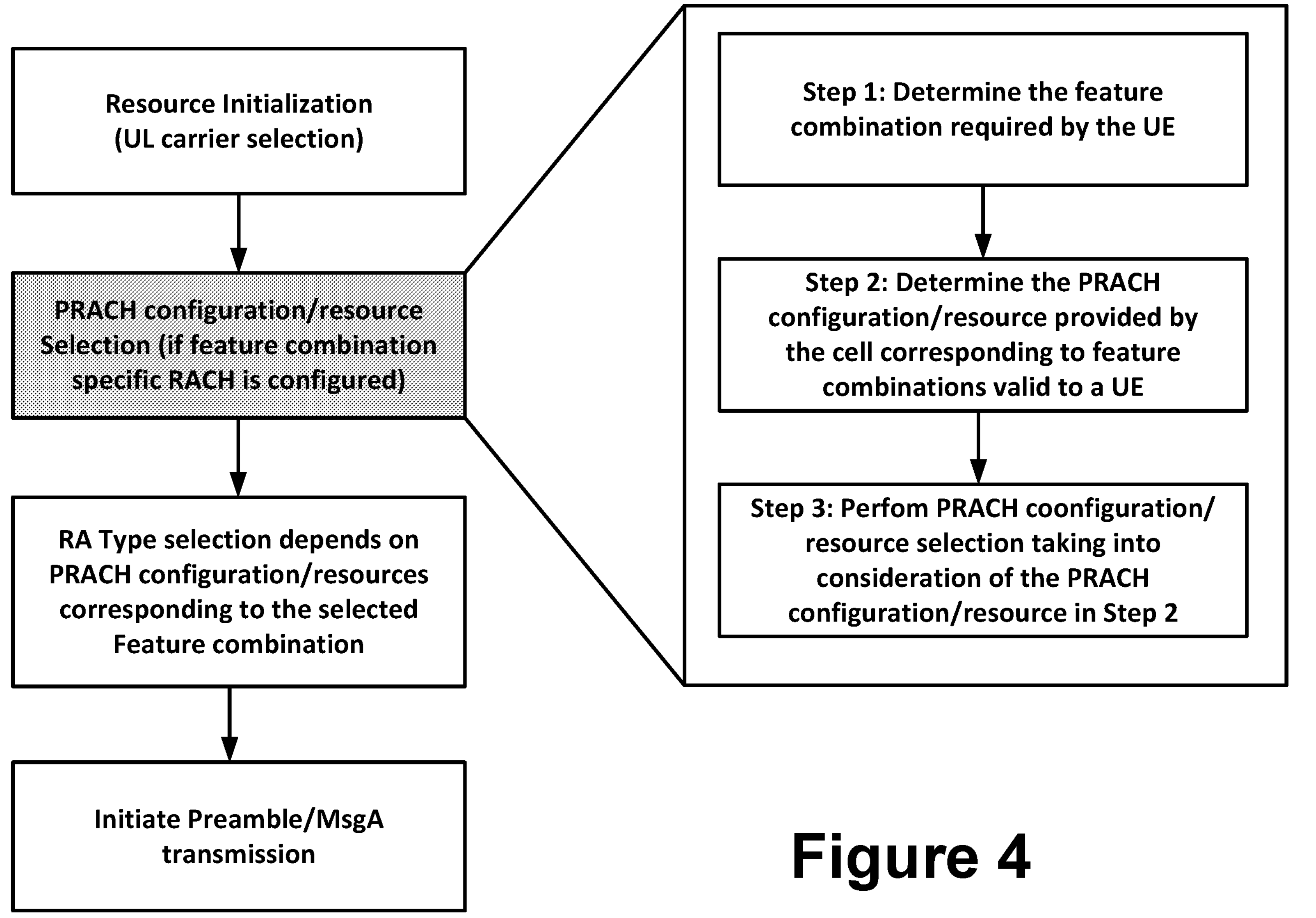
FIG. 4 illustrates an example of a flow of a random access procedure with the update on the selection of the PRACH configuration/resource in accordance with various embodiments.

In summary, FIG. 4 illustrates an example of a flow of a random access procedure with the update on the selection of the PRACH configuration/resource. In this example, the UE selects the PRACH configuration/resources corresponding to the feature combination depending on the options described in Step 3.

Detailed Solution for Problem 3:

Assuming that the combination of 2-step RA and CE are excluded and also fallback to Msg1 only occur once, the only features that can fallback are SDT, slicing and RedCap.

Option 1: Set a fix rules for fallback to Msg1 in the specification common for all feature combination.

For example, fallback to Msg1 only to the 4-step RACH resources corresponding to the feature combination selected (if configured); otherwise no fallback (as per legacy).

Another example, fallback to Msg1 to the 4-step RACH resources corresponding to the feature combination selected (if configured); if not configured, fallback to Msg1 of the common 4-step RACH resources of the BWP (this can also initiate a restart of the RACH procedure)

Option 2: Set further fallback feature combination rules if the fallback to the feature combination specific 4-step RACH is not available (e.g. it is not configured).

In this option, if the fallback to the feature combination specific 4-step RACH is available, the fallback to Msg1 will occur on the feature combination specific 4-step RACH. If the fallback to the feature combination specific 4-step RACH is not available, instead of always restarting the RACH procedure on common 4-step RACH or fallback to Msg1 of 4-step RACH, the network will provide the fallback to Msg1 option (e.g. network provides as part of the configuration in the feature combination specific 2-step RACH an additional parameter indicating the feature combination specific 4-step RACH possible.

For example, the UE initiates the 2-step RACH for SDT, Slicing and RedCap. But cell only configure 4-step RACH for SDT+RedCap or slicing+RedCap or common 4-step RACH. The network can indicate with additional signalling whether the UE can fallback to SDT+RedCap or Slicing+RedCap or common 4-step RACH.

Alternatively, the UE can use the PRACH configuration/resource provided by the cell corresponding to the feature combination that are considered valid by the UE in Step 2 in 'Detailed solution for Problem 2' and are for 4-step RACH and use Step 3 in 'Detailed solution for Problem 2' to decide on which PRACH configuration/resource corresponding to 4-step RACH can be used for the fallback.

Option 3: Leave the decision up to UE implementation on which 4-step RACH resources that are valid as per Step 2 in Detailed solution for Problem 2 to fallback to.

Systems and Implementations

Figure 5:
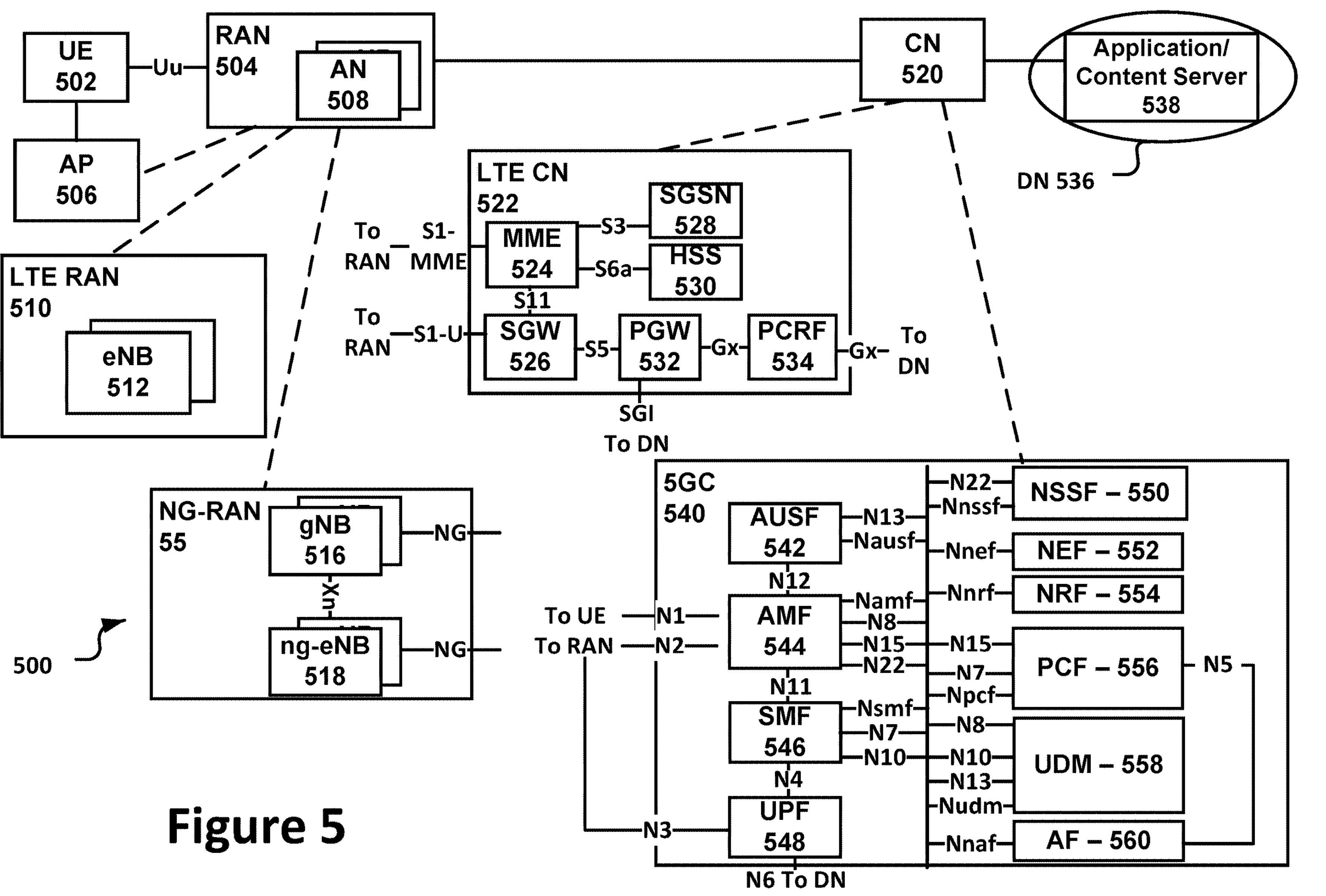
FIG. 5 schematically illustrates a wireless network in accordance with various embodiments.
Figure 6:
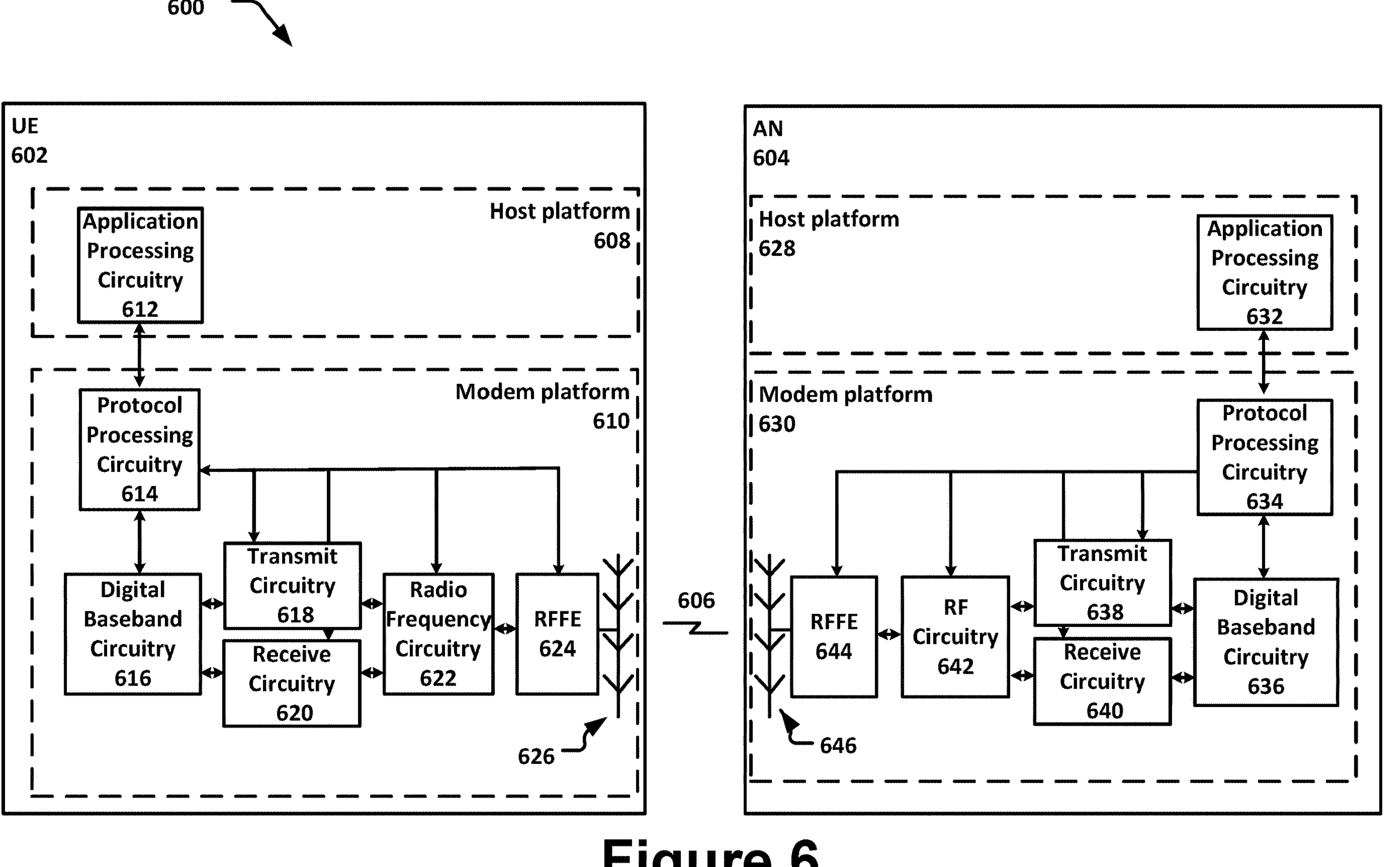
FIG. 6 schematically illustrates components of a wireless network in accordance with various embodiments.
Figure 7:
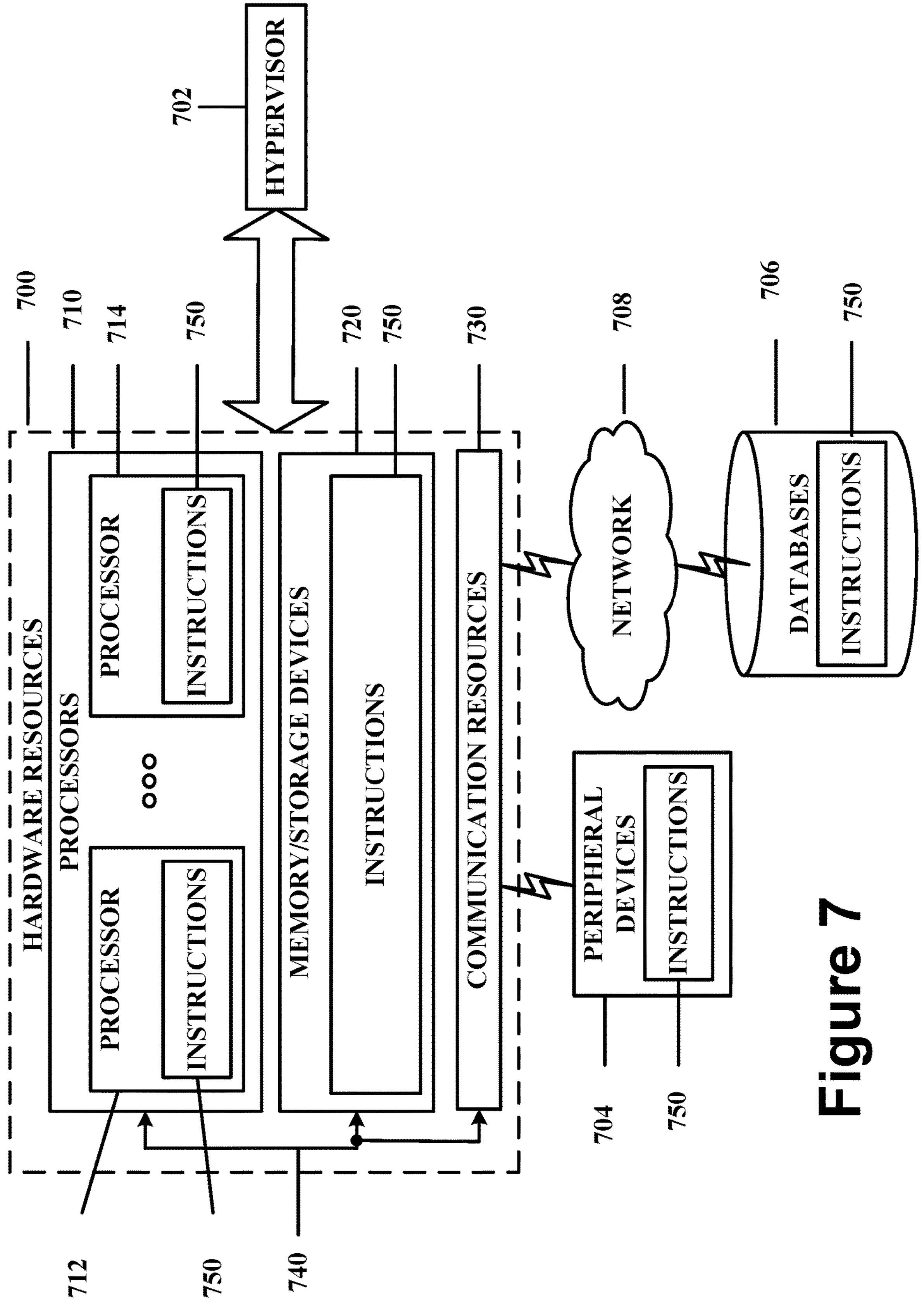
FIG. 7 is a block diagram illustrating components, according to some examples of embodiments, able to read instructions from a machine-readable or computer-readable medium (e.g., a non-transitory machine-readable storage medium) and perform any one or more of the methodologies discussed herein.

FIGS. 5-7 illustrate various systems, devices, and components that may implement aspects of disclosed embodiments.

FIG. 5 illustrates a network 500 in accordance with various embodiments. The network 500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 500 may include a UE 502, which may include any mobile or non-mobile computing device designed to communicate with a RAN 504 via an over-the-air connection. The UE 502 may be communicatively coupled with the RAN 504 by a Uu interface. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 502 may additionally communicate with an AP 506 via an over-the-air connection. The AP 506 may manage a WLAN connection, which may serve to offload some/all network traffic from the RAN 504. The connection between the UE 502 and the AP 506 may be consistent with any IEEE 802.11 protocol, wherein the AP 506 could be a wireless fidelity (Wi-Fi®) router. In some embodiments, the UE 502, RAN 504, and AP 506 may utilize cellular-WLAN aggregation (for example, LWA/LWIP). Cellular-WLAN aggregation may involve the UE 502 being configured by the RAN 504 to utilize both cellular radio resources and WLAN resources.

The RAN 504 may include one or more access nodes, for example, AN 508. AN 508 may terminate air-interface protocols for the UE 502 by providing access stratum protocols including RRC, PDCP, RLC, MAC, and L1 protocols. In this manner, the AN 508 may enable data/voice connectivity between CN 520 and the UE 502. In some embodiments, the AN 508 may be implemented in a discrete device or as one or more software entities running on server computers as part of, for example, a virtual network, which may be referred to as a CRAN or virtual baseband unit pool. The AN 508 be referred to as a BS, gNB, RAN node, eNB, ng-eNB, NodeB, RSU, TRxP, TRP, etc. The AN 508 may be a macrocell base station or a low power base station for providing femtocells, picocells or other like cells having smaller coverage areas, smaller user capacity, or higher bandwidth compared to macrocells.

In embodiments in which the RAN 504 includes a plurality of ANs, they may be coupled with one another via an X2 interface (if the RAN 504 is an LTE RAN) or an Xn interface (if the RAN 504 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs of the RAN 504. For example, the UE 502 and RAN 504 may use carrier aggregation to allow the UE 502 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 502 or AN 508 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 504 may be an LTE RAN 510 with eNBs, for example, eNB 512. The LTE RAN 510 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHZ bands.

In some embodiments, the RAN 504 may be an NG-RAN 514 with gNBs, for example, gNB 516, or ng-eNBs, for example, ng-eNB 518. The gNB 516 may connect with 5G-enabled UEs using a 5G NR interface. The gNB 516 may connect with a 5G core through an NG interface, which may include an N2 interface or an N3 interface. The ng-eNB 518 may also connect with the 5G core through an NG interface, but may connect with a UE via an LTE air interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF 548 (e.g., N3 interface), and an NG control plane (NG-C) interface, which is a signaling interface between the nodes of the NG-RAN514 and an AMF 544 (e.g., N2 interface).

The NG-RAN 514 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (for example, PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520 that includes network elements to provide various functions to support data and telecommunications services to customers/subscribers (for example, users of UE 502). The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

In some embodiments, the CN 520 may be an LTE CN 522, which may also be referred to as an EPC. The LTE CN 522 may include MME 524, SGW 526, SGSN 528, HSS 530, PGW 532, and PCRF 534 coupled with one another over interfaces (or "reference points") as shown. Functions of the elements of the LTE CN 522 may be briefly introduced as follows.

The MME 524 may implement mobility management functions to track a current location of the UE 502 to facilitate paging, bearer activation/deactivation, handovers, gateway selection, authentication, etc.

The SGW 526 may terminate an S1 interface toward the RAN and route data packets between the RAN and the LTE CN 522. The SGW 526 may be a local mobility anchor point for inter-RAN node handovers and also may provide an anchor for inter-3GPP mobility. Other responsibilities may include lawful intercept, charging, and some policy enforcement.

The SGSN 528 may track a location of the UE 502 and perform security functions and access control. In addition, the SGSN 528 may perform inter-EPC node signaling for mobility between different RAT networks; PDN and S-GW selection as specified by MME 524; MME selection for handovers; etc. The S3 reference point between the MME 524 and the SGSN 528 may enable user and bearer information exchange for inter-3GPP access network mobility in idle/active states.

The HSS 530 may include a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the LTE CN 520.

The PGW 532 may terminate an SGi interface toward a data network (DN) 536 that may include an application/content server 538. The PGW 532 may route data packets between the LTE CN 522 and the data network 536. The PGW 532 may be coupled with the SGW 526 by an S5 reference point to facilitate user plane tunneling and tunnel management. The PGW 532 may further include a node for policy enforcement and charging data collection (for example, PCEF). Additionally, the SGi reference point between the PGW 532 and the data network 536 may be an operator external public, a private PDN, or an intra-operator packet data network, for example, for provision of IMS services. The PGW 532 may be coupled with a PCRF 534 via a Gx reference point.

The PCRF 534 is the policy and charging control element of the LTE CN 522. The PCRF 534 may be communicatively coupled to the app/content server 538 to determine appropriate QoS and charging parameters for service flows. The PCRF 532 may provision associated rules into a PCEF (via Gx reference point) with appropriate TFT and QCI.

In some embodiments, the CN 520 may be a 5GC 540. The 5GC 540 may include an AUSF 542, AMF 544, SMF 546, UPF 548, NSSF 550, NEF 552, NRF 554, PCF 556, UDM 558, and AF 560 coupled with one another over interfaces (or "reference points") as shown. Functions of the elements of the 5GC 540 may be briefly introduced as follows.

The AUSF 542 may store data for authentication of UE 502 and handle authentication-related functionality. The AUSF 542 may facilitate a common authentication framework for various access types. In addition to communicating with other elements of the 5GC 540 over reference points as shown, the AUSF 542 may exhibit an Nausf service-based interface.

The AMF 544 may allow other functions of the 5GC 540 to communicate with the UE 502 and the RAN 504 and to subscribe to notifications about mobility events with respect to the UE 502. The AMF 544 may be responsible for registration management (for example, for registering UE 502), connection management, reachability management, mobility management, lawful interception of AMF-related events, and access authentication and authorization. The AMF 544 may provide transport for SM messages between the UE 502 and the SMF 546, and act as a transparent proxy for routing SM messages. AMF 544 may also provide transport for SMS messages between UE 502 and an SMSF. AMF 544 may interact with the AUSF 542 and the UE 502 to perform various security anchor and context management functions. Furthermore, AMF 544 may be a termination point of a RAN CP interface, which may include or be an N2 reference point between the RAN 504 and the AMF 544; and the AMF 544 may be a termination point of NAS (N1) signaling, and perform NAS ciphering and integrity protection. AMF 544 may also support NAS signaling with the UE 502 over an N3 IWF interface.

The SMF 546 may be responsible for SM (for example, session establishment, tunnel management between UPF 548 and AN 508); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 544 over N2 to AN 508; and determining SSC mode of a session. SM may refer to management of a PDU session, and a PDU session or "session" may refer to a PDU connectivity service that provides or enables the exchange of PDUs between the UE 502 and the data network 536.

The UPF 548 may act as an anchor point for intra-RAT and inter-RAT mobility, an external PDU session point of interconnect to data network 536, and a branching point to support multi-homed PDU session. The UPF 548 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 548 may include an uplink classifier to support routing traffic flows to a data network.

The NSSF 550 may select a set of network slice instances serving the UE 502. The NSSF 550 may also determine allowed NSSAI and the mapping to the subscribed S-NSSAIs if needed, The NSSF 550 may also determine the AMF set to be used to serve the UE 502, or a list of candidate AMFs based on a suitable configuration and possibly by querying the NRF 554. The selection of a set of network slice instances for the UE 502 may be triggered by the AMF 544 with which the UE 502 is registered by interacting with the NSSF 550, which may lead to a change of AMF. The NSSF 550 may interact with the AMF 544 via an N22 reference point; and may communicate with another NSSF in a visited network via an N31 reference point (not shown). Additionally, the NSSF 550 may exhibit an Nnssf service-based interface.

The NEF 552 may securely expose services and capabilities provided by 3GPP network functions for third party, internal exposure/re-exposure, AFs (e.g., AF 560), edge computing or fog computing systems, etc. In such embodiments, the NEF 552 may authenticate, authorize, or throttle the AFs. NEF 552 may also translate information exchanged with the AF 560 and information exchanged with internal network functions. For example, the NEF 552 may translate between an AF-Service-Identifier and an internal 5GC information. NEF 552 may also receive information from other NFs based on exposed capabilities of other NFs. This information may be stored at the NEF 552 as structured data, or at a data storage NF using standardized interfaces. The stored information can then be re-exposed by the NEF 552 to other NFs and AFs, or used for other purposes such as analytics. Additionally, the NEF 552 may exhibit an Nnef service-based interface.

The NRF 554 may support service discovery functions, receive NF discovery requests from NF instances, and provide the information of the discovered NF instances to the NF instances. NRF 554 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 554 may exhibit the Nnrf service-based interface.

The PCF 556 may provide policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 may handle subscription-related information to support the network entities' handling of communication sessions, and may store subscription data of UE 502. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 502) for the NEF 552. The Nudr service-based interface may be exhibited by the UDR 221 to allow the UDM 558, PCF 556, and NEF 552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

The AF 560 may provide application influence on traffic routing, provide access to NEF, and interact with the policy framework for policy control.

In some embodiments, the 5GC 540 may enable edge computing by selecting operator/3$^{rd}$ party services to be geographically close to a point that the UE 502 is attached to the network. This may reduce latency and load on the network. To provide edge-computing implementations, the 5GC 540 may select a UPF 548 close to the UE 502 and execute traffic steering from the UPF 548 to data network 536 via the N6 interface. This may be based on the UE subscription data, UE location, and information provided by the AF 560. In this way, the AF 560 may influence UPF (re)selection and traffic routing. Based on operator deployment, when AF 560 is considered to be a trusted entity, the network operator may permit AF 560 to interact directly with relevant NFs. Additionally, the AF 560 may exhibit an Naf service-based interface.

The data network 536 may represent various network operator services, Internet access, or third party services that may be provided by one or more servers including, for example, application/content server 538.

FIG. 6 schematically illustrates a wireless network 600 in accordance with various embodiments. The wireless network 600 may include a UE 602 in wireless communication with an AN 604. The UE 602 and AN 604 may be similar to, and substantially interchangeable with, like-named components described elsewhere herein.

The UE 602 may be communicatively coupled with the AN 604 via connection 606. The connection 606 is illustrated as an air interface to enable communicative coupling, and can be consistent with cellular communications protocols such as an LTE protocol or a 5G NR protocol operating at mmWave or sub-6 GHz frequencies.

The UE 602 may include a host platform 608 coupled with a modem platform 610. The host platform 608 may include application processing circuitry 612, which may be coupled with protocol processing circuitry 614 of the modem platform 610. The application processing circuitry 612 may run various applications for the UE 602 that source/sink application data. The application processing circuitry 612 may further implement one or more layer operations to transmit/receive application data to/from a data network. These layer operations may include transport (for example UDP) and Internet (for example, IP) operations The protocol processing circuitry 614 may implement one or more of layer operations to facilitate transmission or reception of data over the connection 606. The layer operations implemented by the protocol processing circuitry 614 may include, for example, MAC, RLC, PDCP, RRC and NAS operations.

The modem platform 610 may further include digital baseband circuitry 616 that may implement one or more layer operations that are "below" layer operations performed by the protocol processing circuitry 614 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 610 may further include transmit circuitry 618, receive circuitry 620, RF circuitry 622, and RF front end (RFFE) 624, which may include or connect to one or more antenna panels 626. Briefly, the transmit circuitry 618 may include a digital-to-analog converter, mixer, intermediate frequency (IF) components, etc.; the receive circuitry 620 may include an analog-to-digital converter, mixer, IF components, etc.; the RF circuitry 622 may include a low-noise amplifier, a power amplifier, power tracking components, etc.; RFFE 624 may include filters (for example, surface/bulk acoustic wave filters), switches, antenna tuners, beamforming components (for example, phase-array antenna components), etc. The selection and arrangement of the components of the transmit circuitry 618, receive circuitry 620, RF circuitry 622, RFFE 624, and antenna panels 626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 614 may include one or more instances of control circuitry (not shown) to provide control functions for the transmit/receive components.

A UE reception may be established by and via the antenna panels 626, RFFE 624, RF circuitry 622, receive circuitry 620, digital baseband circuitry 616, and protocol processing circuitry 614. In some embodiments, the antenna panels 626 may receive a transmission from the AN 604 by receive-beamforming signals received by a plurality of antennas/antenna elements of the one or more antenna panels 626.

A UE transmission may be established by and via the protocol processing circuitry 614, digital baseband circuitry 616, transmit circuitry 618, RF circuitry 622, RFFE 624, and antenna panels 626. In some embodiments, the transmit components of the UE 604 may apply a spatial filter to the data to be transmitted to form a transmit beam emitted by the antenna elements of the antenna panels 626.

Similar to the UE 602, the AN 604 may include a host platform 628 coupled with a modem platform 630. The host platform 628 may include application processing circuitry 632 coupled with protocol processing circuitry 634 of the modem platform 630. The modem platform may further include digital baseband circuitry 636, transmit circuitry 638, receive circuitry 640, RF circuitry 642, RFFE circuitry 644, and antenna panels 646. The components of the AN 604 may be similar to and substantially interchangeable with like-named components of the UE 602. In addition to performing data transmission/reception as described above, the components of the AN 608 may perform various logical functions that include, for example, RNC functions such as radio bearer management, uplink and downlink dynamic radio resource management, and data packet scheduling.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/sub-slices to utilize the hardware resources 700.

The processors 710 may include, for example, a processor 712 and a processor 714. The processors 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, etc.), cellular communication components, NFC components, Bluetooth R (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Example Procedures

In some embodiments, the electronic device(s), network(s), system(s), chip(s) or component(s), or portions or implementations thereof, of FIGS. 5-7, or some other figure herein, may be configured to perform one or more processes, techniques, or methods as described herein, or portions thereof.

One such process is depicted in FIG. 8. In this example, process 800 includes, at 805, receiving, by a user equipment (UE) from a next-generation NodeB (gNB), a message containing an information element (IE) that includes random access channel (RACH) configuration information comprising a list of RACH features or feature combinations supported by a network. The process further includes, at 810, selecting a set of RACH resources for a RACH procedure based on the RACH configuration information and RACH features or feature combinations supported by the UE.

Another such process is depicted in FIG. 9. In this example, process 900 includes, at 905, retrieving, from a memory, random access channel (RACH) configuration information included in an information element (IE) received in a message from an a next-generation NodeB (gNB), the RACH configuration information comprising a list of RACH features or feature combinations supported by a network. The process further includes, at 910, selecting a set of RACH resources for a RACH procedure based on the RACH configuration information and RACH features or feature combinations supported by the UE.

Another such process is depicted in FIG. 10. In this example, process 1000 includes, at 1005, receiving, from a next-generation NodeB (gNB), a message containing an information element (IE) that includes random access channel (RACH) configuration information comprising a list of RACH features or feature combinations supported by a network. The process further includes, at 1010, selecting a set of RACH resources for a RACH procedure based on the RACH configuration information and RACH features or feature combinations supported by the UE, wherein the set of RACH resources is selected based on one or more of: one or more of: a reference signal received power (RSRP) threshold (e.g., corresponding to whether Msg3 repetition is needed for a coverage enhancement (CovEnh) UE), whether the UE is a reduced capability (RedCap) UE, a slice group determined by an upper layer, applicability of small data transmission (SDT) to the UE, and an availability of RACH resources for a cell.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of using the physical random access channel (PRACH) to identify multiple features and/or combinations of features.

Example 2 may include the method of example 1 or some other example herein, further comprising receiving the feature specific and combination of features specific PRACH configuration/resources signalled by the network.

Example 3 may include the method of examples 1 and 2 or some other example herein, further comprising determining the feature specific and combination of feature specific PRACH configuration/resources possible by the UE Example 4 may include the method of example 3 or some other example herein, wherein determines the feature specific and combination of feature specific PRACH configuration/resources signalled by the network that are subset of the feature specific and combination of feature specific PRACH configuration/resources possible by the UE Example 5 may include the UE of example 4 or some other example herein, wherein the UE determines the PRACH configuration/resources from the subset of the feature specific and combination of feature specific PRACH configuration/resources possible by the UE Example 6 may include the method of example 5 or some other example herein, wherein the UE selects the PRACH configuration/resources from the subset of the feature specific and combination of feature specific PRACH configuration/resources possible by the UE based on UE implementation Example 7 may include the method of example 5 or some other example herein, wherein the UE selects the legacy common PRACH configuration/resources configured in the BWP if no PRACH configuration/resources signalled by the network correspond to the feature combination possible/supported by the UE Example 8 may include the method of example 5 or some other example herein, wherein the UE selects the PRACH configuration/resources corresponding to feature combination based on the maximum number of features matching between the feature combination supported by the cell and the feature combination possible by the UE.

Example 9 may include the method of example 5 or some other example herein, wherein the UE selects the PRACH configuration/resources corresponding to feature combination supported by the cell with the highest priority Example 10 may include the UE of example 5 or some other example herein, wherein selects the PRACH configuration/resources corresponding to feature combination using the selection schemes in examples 7, 8 and 9.

Example 11 may include the method of example 1 or some other example herein, wherein the network signals the feature specific and combination of features specific PRACH configuration/resources.

Example 12 may include the method of example 1 or some other example herein, wherein upon retransmitting PRACH for a certain number of times, the UE performs selection of PRACH configuration/resources corresponding to feature or combinations of features for the fallback from 4-step RACH to 2-step RACH.

Example 13 may include the method of example 12 or some other example herein, wherein the UE performs the fallback based a set of fix rules for fallback to Msg1 in the specification common for all feature combination.

Example 14 may include the method of example 12 or some other example herein, wherein the UE performs the fallback based on further fallback feature combination rules if the fallback to the feature combination specific 4-step RACH is not available.

Example 15 may include the method of example 13 or some other example herein, wherein the UE performs the fallback based on network providing the fallback options for a particular 2-step RACH PRACH configuration/resources Example 16 may include the method of example 13 or some other example herein, wherein the UE performs the fallback based on the PRACH configuration/resource provided by the cell corresponding to the feature combinations that are determined as in example 4 and select the PRACH configuration/resource based on examples 5, 6,7,8 and 10.

Example 17 may include the method of example 13 or some other example herein, wherein the UE performs the fallback based on UE implementation.

Example X1 includes one or more computer-readable media storing instructions that, when executed by one or more processors, configure a user equipment (UE) to:

receive, from a next-generation NodeB (gNB), a message containing an information element (IE) that includes random access channel (RACH) configuration information comprising a list of RACH features or feature combinations supported by a network; and select a set of RACH resources for a RACH procedure based on the RACH configuration information and RACH features or feature combinations supported by the UE.

Example X2 includes the one or more computer-readable media of example X1 or some other example herein, wherein the set of RACH resources is selected based further on a reference signal received power (RSRP) threshold.

Example X3 includes the one or more computer-readable media of example X1 or some other example herein, wherein the set of RACH resources is selected based further on whether the UE is a reduced capability (RedCap) UE.

Example X4 includes the one or more computer-readable media of example X1 or some other example herein, wherein the set of RACH resources is selected based further on a slice group determined by an upper layer.

Example X5 includes the one or more computer-readable media of example X1 or some other example herein, wherein the set of RACH resources is selected based further on applicability of small data transmission (SDT) to the UE.

Example X6 includes the one or more computer-readable media of example X1 or some other example herein, wherein the set of RACH resources is selected based further on an availability of RACH resources for a cell.

Example X7 includes the one or more computer-readable media of example X1 or some other example herein, wherein the set of RACH resources is selected based further on a predefined prioritization associated with a feature.

Example X8 includes the one or more computer-readable media of example X7 or some other example herein, wherein based on the predefined prioritization, the set of RACH resources is selected based on a highest assigned priority for a single feature or a highest aggregated priority for a combination of features.

Example X9 includes the one or more computer-readable media of example X1 or some other example herein, wherein the IE includes configuration parameters for a feature associated with one or more of:

an MsgA transmission;
coverage enhancement (CovEnh);
slicing;
SDT;
RedCap; and
a RACH preamble.

Example X10 includes the one or more computer-readable media of any of examples X1-X9 or some other example herein, wherein the message comprising the IE is received from the gNB via radio resource control (RRC) signaling.

Example X11 includes an apparatus of a user equipment (UE) comprising:

memory to store random access channel (RACH) configuration information included in an information element (IE) received in a message from an a next-generation NodeB (gNB), the RACH configuration information comprising a list of RACH features or feature combinations supported by a network; and processing circuitry, coupled with the memory, to:

retrieve the RACH configuration information from the memory; and select a set of RACH resources for a RACH procedure based on the RACH configuration information and RACH features or feature combinations supported by the UE.

Example X12 includes the apparatus of example X11 or some other example herein, wherein the set of RACH resources is selected based further on one or more of: a reference signal received power (RSRP) threshold, whether the UE is a reduced capability (RedCap) UE, a slice group determined by an upper layer, applicability of small data transmission (SDT) to the UE, and an availability of RACH resources for a cell.

Example X13 includes the apparatus of example X11 or some other example herein, wherein the set of RACH resources is selected based further on a predefined prioritization associated with a feature.

Example X14 includes the apparatus of example X13 or some other example herein, wherein based on the predefined prioritization, the set of RACH resources is selected based on a highest assigned priority for a single feature or a highest aggregated priority for a combination of features.

Example X15 includes the apparatus of example X11 or some other example herein, wherein the IE includes configuration parameters for a feature associated with one or more of:

an MsgA transmission;
coverage enhancement (CovEnh);
slicing;
SDT;
RedCap; and
a RACH preamble.

Example X16 includes the apparatus of any of examples X11-X15 or some other example herein, wherein the message comprising the IE is received from the gNB via radio resource control (RRC) signaling.

Example X17 includes one or more computer-readable media storing instructions that, when executed by one or more processors, configure a user equipment (UE) to:

receive, from a next-generation NodeB (gNB), a message containing an information element (IE) that includes random access channel (RACH) configuration information comprising a list of RACH features or feature combinations supported by a network; and select a set of RACH resources for a RACH procedure based on the RACH configuration information and RACH features or feature combinations supported by the UE, wherein the set of RACH resources is selected based on one or more of: one or more of: a reference signal received power (RSRP) threshold, whether the UE is a reduced capability (RedCap) UE, a slice group determined by an upper layer, applicability of small data transmission (SDT) to the UE, and an availability of RACH resources for a cell.

Example X18 includes the one or more computer-readable media of example X17 or some other example herein, wherein the set of RACH resources is selected based further on a predefined prioritization associated with a feature.

Example X19 includes the one or more computer-readable media of example X18 or some other example herein, wherein based on the predefined prioritization, the set of RACH resources is selected based on a highest assigned priority for a single resource or highest aggregated priority for a combination of features.

Example X20 includes the one or more computer-readable media of example X17 or some other example herein, wherein the IE includes configuration parameters for a feature associated with one or more of:

an MsgA transmission;
coverage enhancement (CovEnh);
slicing;
SDT;
RedCap; and
a RACH preamble.

Example X21 includes the one or more computer-readable media of any of examples X17-X20 or some other example herein, wherein the message comprising the IE is received from the gNB via radio resource control (RRC) signaling.

Example Z01 may include an apparatus comprising means to perform one or more elements of a method described in or related to any of examples 1-X21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X21, or any other method or process described herein.

Example Z03 may include an apparatus comprising logic, modules, or circuitry to perform one or more elements of a method described in or related to any of examples 1-X21, or any other method or process described herein.

Example Z04 may include a method, technique, or process as described in or related to any of examples 1-X21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X21, or portions thereof.

Example Z06 may include a signal as described in or related to any of examples 1-X21, or portions or parts thereof.

Example Z07 may include a datagram, packet, frame, segment, protocol data unit (PDU), or message as described in or related to any of examples 1-X21, or portions or parts thereof, or otherwise described in the present disclosure.

Example Z08 may include a signal encoded with data as described in or related to any of examples 1-X21, or portions or parts thereof, or otherwise described in the present disclosure.

Example Z09 may include a signal encoded with a datagram, packet, frame, segment, protocol data unit (PDU), or message as described in or related to any of examples 1-X21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X21, or portions thereof.

Example Z11 may include a computer program comprising instructions, wherein execution of the program by a processing element is to cause the processing element to carry out the method, techniques, or process as described in or related to any of examples 1-X21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |

-continued

| | |
|---|---|
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |

-continued

| | |
|---|---|
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |

-continued

| | |
|---|---|
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |

-continued

| | |
|---|---|
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |

-continued

| | |
|---|---|
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |

-continued

| | |
|---|---|
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |

-continued

| | |
|---|---|
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |

-continued

| | |
|---|---|
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. One or more non-transitory computer-readable media storing instructions that, when executed by one or more processors, configure a user equipment (UE) to:

receive, from a next-generation NodeB (gNB), a message containing an information element (IE) that includes random access channel (RACH) configuration information comprising a list of RACH features or feature combinations supported by a network; and select a set of RACH resources for a RACH procedure based on the RACH configuration information and RACH features or feature combinations supported by the UE, selecting the set comprises determining, from the list, a set of valid feature combinations based on the RACH features supported by the UE, and selecting from among the valid feature combinations using individual priority values assigned by the network to respective RACH features, a valid feature combination being selected based on the individual priority values of the RACH features within the valid feature combination.

2. The one or more non-transitory computer-readable media of claim 1, wherein the set of RACH resources is selected based further on a reference signal received power (RSRP) threshold.

3. The one or more non-transitory computer-readable media of claim 1, wherein the set of RACH resources is selected based further on whether the UE is a reduced capability (RedCap) UE.

4. The one or more non-transitory computer-readable media of claim 1, wherein the set of RACH resources is selected based further on a slice group determined by an upper layer.

5. The one or more non-transitory computer-readable media of claim 1, wherein the set of RACH resources is selected based further on applicability of small data transmission (SDT) to the UE.

6. The one or more non-transitory computer-readable media of claim 1, wherein the set of RACH resources is selected based further on an availability of RACH resources for a cell.

7. The one or more non-transitory computer-readable media of claim 1, wherein the set of RACH resources is selected based further on a predefined prioritization associated with a feature.

8. The one or more non-transitory computer-readable media of claim 7, wherein based on the predefined prioritization, the set of RACH resources is selected based on a highest aggregated priority for a combination of features.

9. The one or more non-transitory computer-readable media of claim 1, wherein the IE includes configuration parameters for a feature associated with one or more of:

a MsgA transmission;
coverage enhancement (CovEnh);
slicing;
SDT;
RedCap; and
a RACH preamble.

10. The one or more non-transitory computer-readable media of claim 1, wherein the message comprising the IE is received from the gNB via radio resource control (RRC) signaling.

11. An apparatus of a user equipment (UE) comprising:
memory to store random access channel (RACH) configuration information included in an information element (IE) received in a message from a next-generation NodeB (gNB), the RACH configuration information comprising a list of RACH features or feature combinations supported by a network; and
processing circuitry, coupled with the memory, to:
retrieve the RACH configuration information from the memory; and
select a set of RACH resources for a RACH procedure based on the RACH configuration information and RACH features or feature combinations supported by the UE, selecting the set comprises determining, from the list, a set of valid feature combinations based on the RACH features supported by the UE, and selecting from among the valid feature combinations using individual priority values assigned by the network to respective RACH features, a valid feature combination being selected based on the individual priority values of the RACH features within the valid feature combination.

12. The apparatus of claim 11, wherein the set of RACH resources is selected based further on one or more of: a reference signal received power (RSRP) threshold, whether the UE is a reduced capability (RedCap) UE, a slice group determined by an upper layer, applicability of small data transmission (SDT) to the UE, and an availability of RACH resources for a cell.

13. The apparatus of claim 11, wherein the set of RACH resources is selected based further on a predefined prioritization associated with a feature.

14. The apparatus of claim 13, wherein based on the predefined prioritization, the set of RACH resources is selected based on a highest aggregated priority for a combination of features.

15. The apparatus of claim 11, wherein the IE includes configuration parameters for a feature associated with one or more of:
MsgA transmission;
coverage enhancement (CovEnh);
slicing;
SDT;
RedCap; and
a RACH preamble.

16. The apparatus of claim 11, wherein the message comprising the IE is received from the gNB via radio resource control (RRC) signaling.

17. One or more non-transitory computer-readable media storing instructions that, when executed by one or more processors, configure a user equipment (UE) to:
receive, from a next-generation NodeB (gNB), a message containing an information element (IE) that includes random access channel (RACH) configuration information comprising a list of RACH features or feature combinations supported by a network; and
select a set of RACH resources for a RACH procedure based on the RACH configuration information and RACH features or feature combinations supported by the UE, wherein the set of RACH resources is selected based on one or more of: a reference signal received power (RSRP) threshold, whether the UE is a reduced capability (RedCap) UE, a slice group determined by an upper layer, applicability of small data transmission (SDT) to the UE, and an availability of RACH resources for a cell, selecting the set comprises determining, from the list, a set of valid feature combinations based on the RACH features supported by the UE, and selecting from among the valid feature combinations using individual priority values assigned by the network to respective RACH features, a valid feature combination being selected based on the individual priority values of the RACH features within the valid feature combination.

18. The one or more non-transitory computer-readable media of claim 17, wherein the set of RACH resources is selected based further on a predefined prioritization associated with a feature.

19. The one or more non-transitory computer-readable media of claim 18, wherein based on the predefined prioritization, the set of RACH resources is selected based on or highest aggregated priority for a combination of features.

20. The one or more non-transitory computer-readable media of claim 17, wherein the IE includes configuration parameters for a feature associated with one or more of:
a MsgA transmission;
coverage enhancement (CovEnh);
slicing;
SDT;
RedCap; and
a RACH preamble.

* * * * *